US012769421B2

(12) United States Patent
Miyamoto et al.

(10) Patent No.: US 12,769,421 B2
(45) Date of Patent: Oct. 20, 2026

(54) POSITION DETECTION SYSTEM, SENSOR CONTROL CIRCUIT, AND ELECTRONIC PEN USING SELECTED PORTION OF SENSOR ELECTRODES AS TRANSMISSION ELECTRODES

(71) Applicant: Wacom Co., Ltd., Saitama (JP)

(72) Inventors: Masayuki Miyamoto, Saitama (JP); Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/899,573

(22) Filed: Sep. 27, 2024

(65) Prior Publication Data

US 2025/0021187 A1 Jan. 16, 2025

Related U.S. Application Data

(62) Division of application No. 17/219,522, filed on Mar. 31, 2021, now Pat. No. 12,135,851.

(30) Foreign Application Priority Data

Apr. 27, 2020 (JP) ................................ 2020-078488

(51) Int. Cl.

*G06F 3/041* (2006.01)
*G06F 3/0354* (2013.01)
*G06F 3/044* (2006.01)

(52) U.S. Cl.

CPC ...... *G06F 3/04166* (2019.05); *G06F 3/03545* (2013.01); *G06F 3/0441* (2019.05); *G06F 3/0442* (2019.05)

(58) Field of Classification Search

CPC .................................................. G06F 3/04166
See application file for complete search history.

(56) References Cited

U.S. PATENT DOCUMENTS

| | | | | |
|---|---|---|---|---|
| 2018/0046272 A1* | 2/2018 | Hara | G06F 3/0383 |
| 2019/0146602 A1* | 5/2019 | Kadowaki | G06F 3/04162 345/174 |
| 2019/0155433 A1 | 5/2019 | Park et al. | |
| 2019/0163320 A1 | 5/2019 | Park et al. | |

(Continued)

FOREIGN PATENT DOCUMENTS

| | | |
|---|---|---|
| JP | 2019091142 A | 6/2019 |
| WO | WO 2019097565 A1 | 5/2019 |

OTHER PUBLICATIONS

Japanese Notice of Reasons for Refusal dated Dec. 5, 2023, for the corresponding Japanese Patent Application No. 2020-078488, 8 pages. (With English Translation).

*Primary Examiner* — Chun-Nan Lin

(74) *Attorney, Agent, or Firm* — Seed Intellectual Property Law Group LLP

(57) ABSTRACT

A position detection system is provided including an electronic pen including pen electrodes, and a sensor control circuit that is connected to a capacitance touch sensor including sensor electrodes. The sensor control circuit controls transmission of uplink signals through the touch sensor. The electronic pen selects one or more reception electrodes from the pen electrodes, and the sensor control circuit selects transmission electrodes from the sensor electrodes. A set of the transmission electrodes and the reception electrodes of the uplink signals is changed according to time in a time-division manner.

4 Claims, 27 Drawing Sheets

(56) References Cited

U.S. PATENT DOCUMENTS

| | | | |
|---|---|---|---|
| 2019/0179475 | A1 | 6/2019 | Seo et al. |
| 2020/0125186 | A1* | 4/2020 | Hara ..................... G06F 3/0442 |
| 2020/0133436 | A1 | 4/2020 | Chen et al. |
| 2021/0041975 | A1 | 2/2021 | Uchino et al. |
| 2021/0124449 | A1 | 4/2021 | Jang et al. |
| 2021/0165510 | A1 | 6/2021 | Yang et al. |
| 2021/0191590 | A1 | 6/2021 | Jang |
| 2021/0263601 | A1 | 8/2021 | Choi |

* cited by examiner

14

| US | 1 | 0 | 1 | 0 |
|---|---|---|---|---|
| DAT2 | 1 | 0 | 1 | 0 |

| US | 0 | 1 | 1 | 0 |
|---|---|---|---|---|
| DAT1 | 0 | 1 | 1 | 0 |

16

| ORIGINAL DATA | 1 | 0 | 1 | 0 |
|---|---|---|---|---|
| DATA AFTER DECODING | 1 | 0 | 0 | 0 |

POSITION DETECTION SYSTEM, SENSOR CONTROL CIRCUIT, AND ELECTRONIC PEN USING SELECTED PORTION OF SENSOR ELECTRODES AS TRANSMISSION ELECTRODES

BACKGROUND OF THE INVENTION

1. Field of the Invention

The present invention relates to a position detection system, a sensor control circuit, and an electronic pen that use a capacitance touch sensor to detect a position.

2. Description of the Related Art

Conventionally, a position detection system is known that includes an active electronic pen, which is a self-powered position indicator (hereinafter, simply referred to as an “electronic pen”), and an electronic device provided with a touch sensor. In this type of system, the electronic pen and the electronic device transmit and receive signals to exchange data or to synchronize the control. Hereinafter, to distinguish the two types of signals, the signal from the electronic device will be referred to as an “uplink signal,” and the signal from the electronic pen will be referred to as a “downlink signal.”

The electronic pen receives the uplink signal through capacitive coupling formed between an electrode provided at the pen tip and a sensor electrode group that is part of the touch sensor, and then converts the uplink signal into a digital signal through a reception circuit to thereby acquire the data supplied from the electronic device. There is a case where, for example, a human body of a user touches a touch surface of the electronic device, and capacitive coupling is formed between the human body of the user and the sensor electrode group. The uplink signal led to the human body may act to change the potential of the human body.

More specifically, on the assumption that [1] the reference potential of the electronic pen is set to the potential of a housing, [2] the user holds the electronic pen, and [3] the uplink signal is led to the electrode of the electronic pen, when [4] there is a possibility that the uplink signal is led to the contact area of the human body and when [5] the relative position and posture relation between the electrode of the electronic pen and the contact area of the human body satisfies a specific condition, fluctuations of the reference potential that hinder the detection of the uplink signal appear at the ground end of the reception circuit of the electronic pen. As a result, the uplink signal led to the electrode of the electronic pen may become temporarily undetectable due to the fluctuations of the reference potential.

FIGS. 28 and 29 schematically depict a state in which the uplink signal is temporarily undetectable. More specifically, FIG. 28 illustrates a configuration of a reception circuit 1, and FIG. 29 illustrates time variation of signal levels measured at nodes 4 and 5 of FIG. 28.

For example, as illustrated in FIG. 28, an input end of the reception circuit 1 is connected to an electrode 2, and a ground end of the reception circuit 1 is grounded (or earth connection is provided) to the housing 3. As can be understood from FIG. 29, GND potential at node 5 is maintained at a substantially constant signal level when the human body is not in contact with the touch surface (during reception of first and second bits). However, when the human body is in contact with the touch surface (during reception of third and fourth bits), the signal level of the GND potential at node 5 changes according to the waveform of the uplink signal at node 4. As a result, there is a phenomenon that the third bit is not correctly received, and the uplink signal is undetectable.

Therefore, a sensor controller is disclosed in Japanese Patent Laid-Open No. 2019-091142 (hereinafter, Patent Document 1), wherein the sensor controller is configured to control driving of a sensor electrode group to transmit, along with an uplink signal, a cancel signal for preventing the uplink signal from appearing at the ground end of a reception circuit of an electronic pen.

However, in Patent Document 1, a function of generating the cancel signal and a function of selectively transmitting two types of signals are additionally required, which complicates the signal processing executed by the sensor controller. Therefore, the technique disclosed in Patent Document 1 still has room for improvement in terms of simplification of functions.

SUMMARY OF THE INVENTION

An object of the present invention is to provide a position detection system, a sensor control circuit, and an electronic pen that can prevent a signal led to a pen electrode included in an electronic pen from becoming temporarily undetectable due to fluctuations of reference potential caused by a signal led to a human body.

A position detection system according to a first aspect of the invention includes an electronic pen including M (M is a natural number) pen electrodes, and a sensor control circuit that is connected to a capacitance touch sensor including N (N is an integer equal to or greater than 2) sensor electrodes and that controls transmission of uplink signals through the touch sensor. The electronic pen selects one or more reception electrodes from the M pen electrodes, the sensor control circuit selects transmission electrodes that are L sensor electrodes satisfying $1<L<N$ from the N sensor electrodes, and a set of the transmission electrodes and the reception electrodes of the uplink signals is changed according to time.

A sensor control circuit according to a second aspect of the invention is used along with an electronic pen including M (M is a natural number) pen electrodes. The sensor control circuit is connected to a capacitance touch sensor including N (N is an integer equal to or greater than 2) sensor electrodes, and the sensor control circuit performs control of selecting transmission electrodes that are L sensor electrodes satisfying $1<L<N$ from the N sensor electrodes and changing a set of the transmission electrodes and reception electrodes of uplink signals according to time.

An electronic pen according to a third aspect of the invention is used along with a sensor control circuit connected to a capacitance touch sensor including N (N is an integer equal to or greater than 2) sensor electrodes. The electronic pen includes M (M is an integer equal to or greater than 2) pen electrodes, and the electronic pen performs control of determining reception electrodes that are one or more pen electrodes among the M pen electrodes and changing a set of transmission electrodes and the reception electrodes of uplink signals according to time.

A sensor control circuit according to a fourth aspect of the invention is connected to a capacitance touch sensor including N (N is an integer equal to or greater than 2) sensor electrodes. The sensor control circuit alternately executes a first detection operation of detecting a contact region or a contact position of a human body with the touch sensor and a second detection operation of detecting an indication position of an electronic pen including a pen electrode. In the second detection operation, the sensor control circuit performs transmission control of selecting, as transmission electrodes, L sensor electrodes satisfying 1<L<N from the N sensor electrodes and transmitting uplink signals from the L transmission electrodes, wherein, when contact with the human body is not detected in the first (touch) detection operation, selects the L transmission electrodes according to a most recently detected indication position of the electronic pen, and when contact with the human body is detected in the first (touch) detection operation, selects the L transmission electrodes according to the contact region or the contact position.

The first to fourth aspects of the invention prevent the signal led to the pen electrode included in the electronic pen from becoming temporarily undetectable due to the fluctuations of reference potential caused by the signal led to the human body.

DETAILED DESCRIPTION OF THE PREFERRED EMBODIMENT

A position detection system, a sensor control circuit, and an electronic pen in the present invention will be described with reference to the attached drawings. Note that the present invention is not limited to an embodiment and modifications described herein, and it is obvious that the present invention can be freely changed without departing from the scope of the invention. In addition, configurations can be readily combined in a technically consistent manner.

[Description of Position Detection System 10]

<Overall Configuration>

Figure 1:
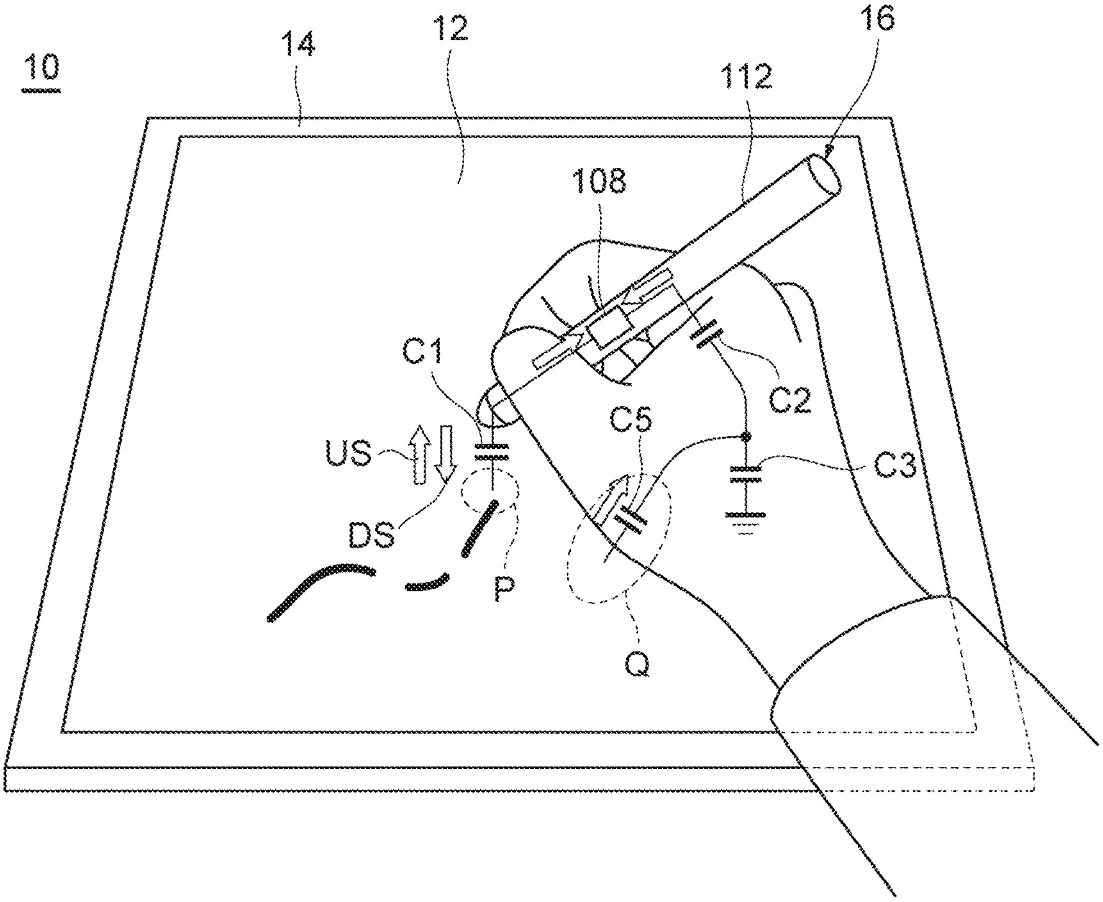
FIG. 1 is an overall configuration diagram of a position detection system in an embodiment of the present invention.

FIG. 1 is an overall configuration diagram of a position detection system 10 according to an embodiment of the present invention. The position detection system 10 basically includes an electronic device 14 including a touch detection surface (hereinafter, referred to as a touch surface 12) and an electronic pen 16 used along with the electronic device 14.

The electronic device 14 includes, for example, a tablet terminal, a smartphone, or a personal computer. The user can hold the electronic pen 16 with one hand and move the electronic pen 16 while pressing the pen tip against the touch surface 12 to draw pictures or write text in the electronic device 14.

The electronic pen 16 is a pen-type pointing device and is capable of communicating with the electronic device 14 in both directions. Hereinafter, a signal transmitted by the electronic device 14 toward the electronic pen 16 will be referred to as an “uplink signal US,” and a signal transmitted by the electronic pen 16 toward the electronic device 14 will be referred to as a “downlink signal DS.” Note that the electronic pen 16 is an “active” stylus that actively generates a signal from electrical energy stored in the electronic pen 16 and that transmits the signal as a downlink signal DS toward the electronic device 14.

Figure 2:
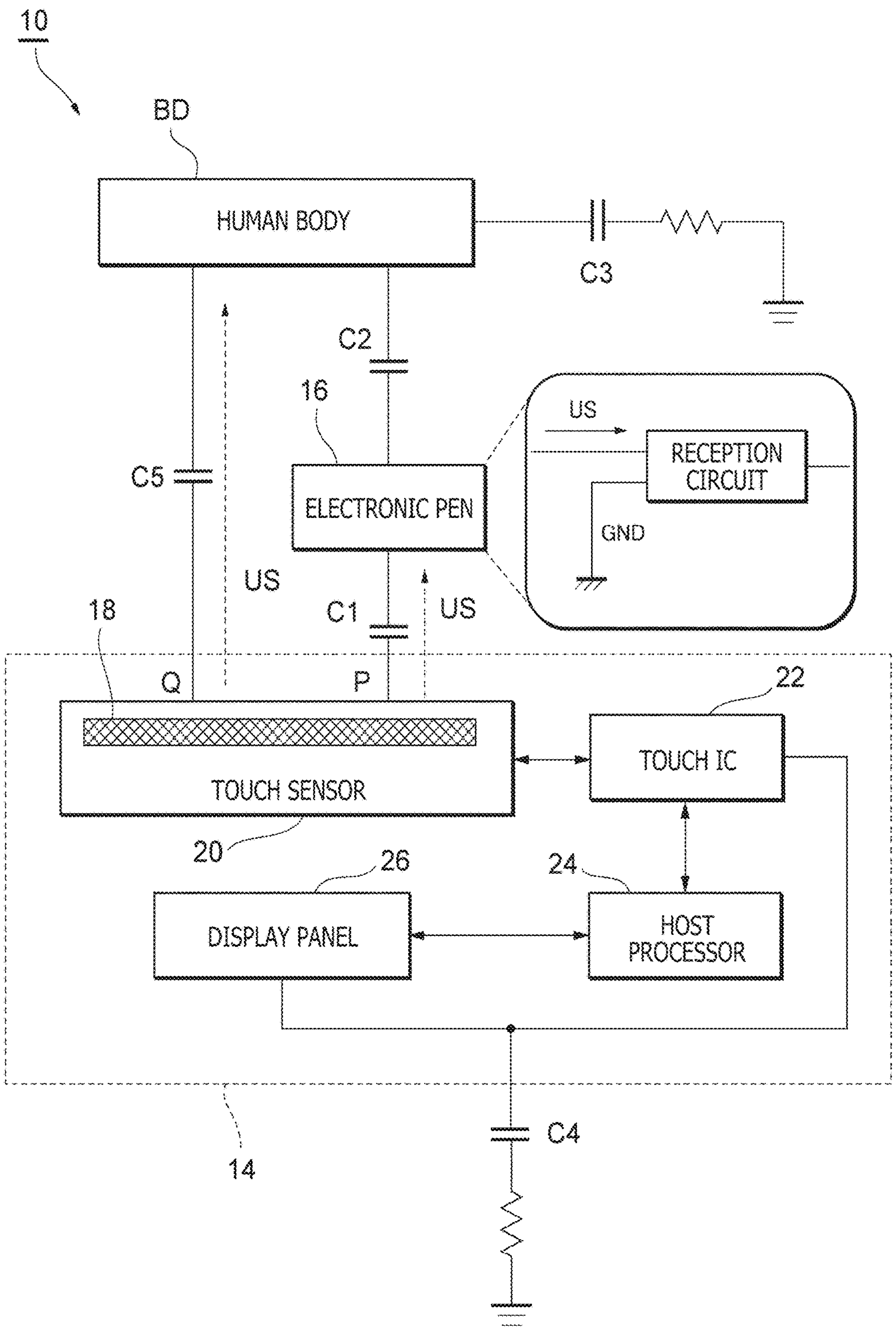
FIG. 2 is a schematic diagram of an electronic device and an electronic pen illustrated in FIG. 1.

FIG. 2 is a schematic diagram of the electronic device 14 and the electronic pen 16 illustrated in FIG. 1. The electronic device 14 includes a touch sensor 20, a touch IC 22 (corresponding to a “sensor control circuit”), a host processor 24, and a display panel 26.

The touch sensor 20 is a capacitance sensor arranged on top of the display panel 26. The touch sensor 20 may be a mutual-capacitance sensor or a self-capacitance sensor. The touch sensor 20 includes a sensor electrode group 18 of electrodes that are separated from each other along an array direction and arranged in a plane shape. The material of the sensor electrode may be indium tin oxide (ITO) or may be metal, such as copper, silver, and gold. Although the touch sensor 20 is an “external” sensor attached to the display panel 26 from the outside in the example of FIG. 2, the touch sensor 20 may be an "internal" (in more detailed classification, on-cell or in-cell) sensor integrated with the display panel 26, instead of the "external" sensor.

The touch IC 22 is an integrated circuit that controls the drive of the touch sensor 20. The touch IC 22 drives the touch sensor 20 based on a control signal supplied from the host processor 24. In this way, the touch IC 22 executes a "pen detection function" for detecting the state of the electronic pen 16 and a "touch detection function" for detecting a touch by a finger of the user or the like.

The host processor 24 includes a processing arithmetic (computing) unit including a central processing unit (CPU), a micro-processing unit (MPU), and a graphics processing unit (GPU). The host processor 24 can read and execute programs stored in a memory, not illustrated, to execute various functions including generation and rendering of digital ink, creation of an image signal, and control of transmission and reception of data.

The display panel 26 may be formed of, for example, a liquid crystal panel, an organic electro luminescence (EL) panel, electronic paper, or the like. The display panel 26 applies a drive voltage to matrix signal lines arrayed in a row direction and a column direction to drive a plurality of pixels to thereby display an image or a video in a display region.

Problem

FIG. 2 illustrates an equivalent circuit diagram of a state in which a human body BD of the user is in contact with the touch surface 12 of the electronic device 14. The following is based on the assumption that [1] the reference potential (hereinafter, also referred to as "GND potential") of the electronic pen 16 is set to the potential of a housing, [2] the user is holding the electronic pen 16, and [3] the uplink signal US is led to an electrode (hereinafter, also referred to as a pen electrode) of the electronic pen 16.

The electronic device 14, the electronic pen 16, and the human body BD are electrically connected to each other through capacitive coupling. The electronic pen 16 is electrically connected to the sensor electrode group 18 through capacitance C1 formed at a position P just below the electrode of the pen tip. The human body BD is grounded through capacitance C3 generated between the GND potential of the electronic pen 16 and the earth. The touch IC 22 and the display panel 26 are commonly grounded through capacitance C4 generated between the GND potential of the electronic device 14 and the earth.

A ground end of a reception circuit of the electronic pen 16 is connected to the earth through the housing and the human body BD. As a result, the reception circuit can execute the intended operation of detecting the uplink signal US from an input end. However, the human body BD (for example, a part of the hand that is holding the electronic pen 16) may come into contact with the touch surface 12 of the electronic device 14, and the human body BD may be electrically connected to the sensor electrode group 18 through capacitance C5 formed at a position Q on the touch surface 12. That is, the uplink signal US led to the human body BD may act to change the potential of the human body BD.

When the relative position and posture relation between the electrode of the electronic pen 16 and the contact area of the human body BD satisfies a specific condition, fluctuations of the GND potential that hinder the detection of the uplink signal US appear at the ground end of the reception circuit of the electronic pen 16. As a result, there may be a situation in which the uplink signal US received through the pen electrode becomes temporarily undetectable due to the fluctuations of the GND potential.

Figure 3:
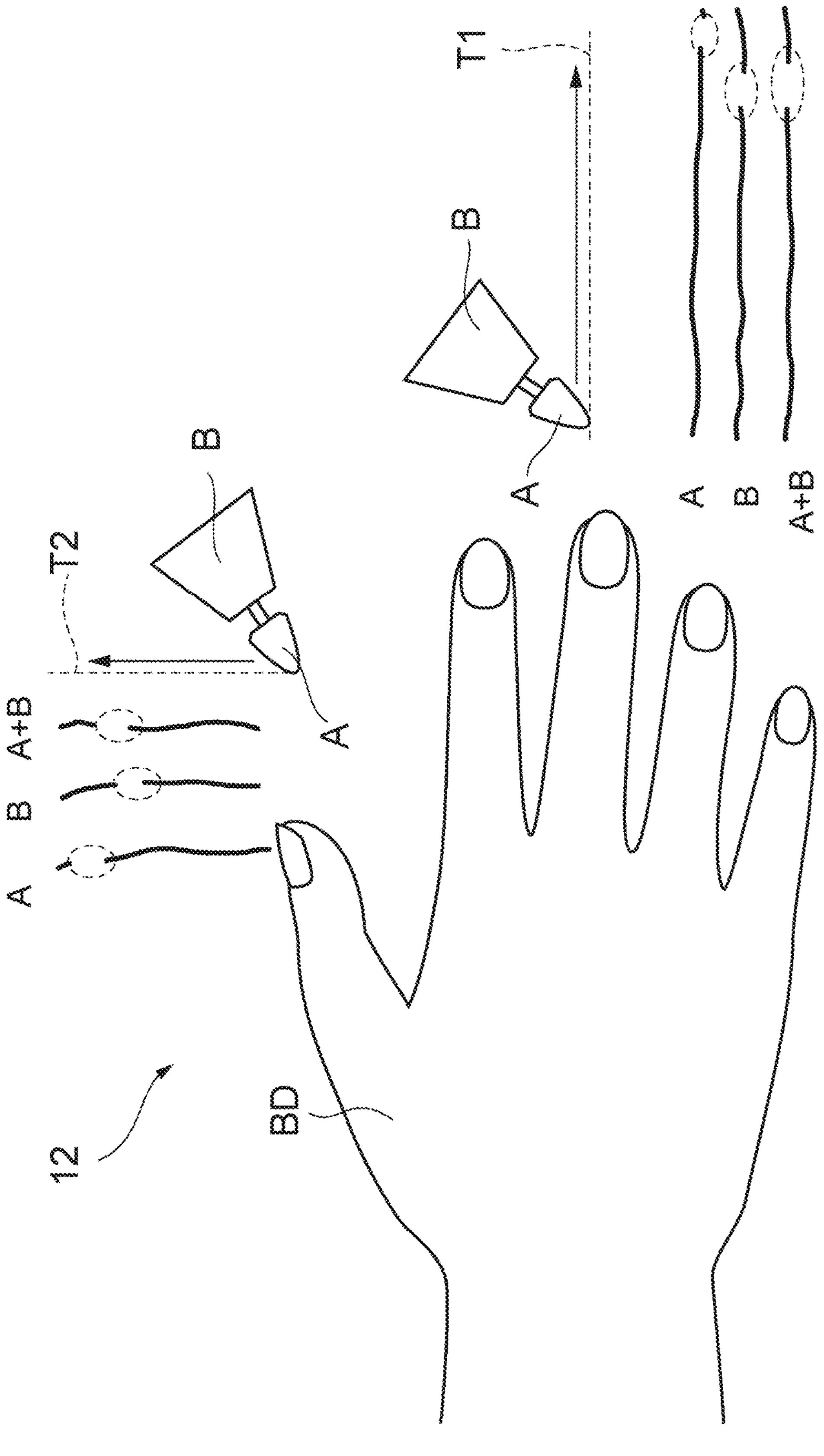
FIG. 3 schematically depicts a detection result of an uplink signal according to the position of the electronic pen.

FIG. 3 schematically depicts a detection result of the uplink signal US according to the position of the electronic pen 16. In the case illustrated here, the palm of the right hand of the user is in contact with the touch surface 12, and the user uses the left hand (not shown) to hold and move the electronic pen 16 along trajectories T1 and T2 around the right hand. The electronic device 14 can follow the indication position of the electronic pen 16 to display a stroke (trajectory of indication position) only when the electronic device 14 and the electronic pen 16 can communicate in both directions. Therefore, a stroke line can be drawn without interruption when the reception circuit of the electronic pen 16 can continuously detect the uplink signal US without interruption.

The electronic pen 16 uses three types of electrodes "A," "B," and "A+B" to receive the uplink signal US. "A" is a tip electrode provided at the pen tip of the electronic pen 16, and "B" is a ring electrode provided behind the pen tip. Note that "A+B" corresponds to an integral electrode in which the tip electrode and the ring electrode are electrically connected. For convenience of illustration, the positions of drawing results of strokes drawn by the three types of electrodes are shifted in the vertical direction (in the case of trajectory T1) or the horizontal direction (trajectory T2).

As can be understood from FIG. 3, although the tendencies of disconnections of strokes (sections surrounded by dashed lines) are similar to each other in three types of drawing results, there is almost no regularity regarding the position and the length of disconnection. The reason is that the trigger conditions regarding the relative position and posture relation are limited, and the uplink signal US locally and suddenly becomes undetectable due to a delicate balance between the electrode of the electronic pen 16 and the contact area of the human body BD.

A method is proposed that prevents the uplink signal US led to the pen electrode included in the electronic pen from becoming temporarily undetectable due to the fluctuations of the GND potential caused by the signal led to the human body BD. Specifically, [1] the electronic pen 16 selects one or more reception electrodes from M pen electrodes, [2] the touch IC 22 selects L transmission electrodes from N sensor electrodes that are part of the touch sensor 20, and [3] the position detection system 10 changes a set of transmission electrodes and reception electrodes of the uplink signals US according to time to thereby realize the method. M is any integer equal to or greater than 1. N is any integer equal to or greater than 2. L is any integer satisfying a relation of $1<L<N$.

[Description of Touch IC 22]

<Configuration>

Figure 4:
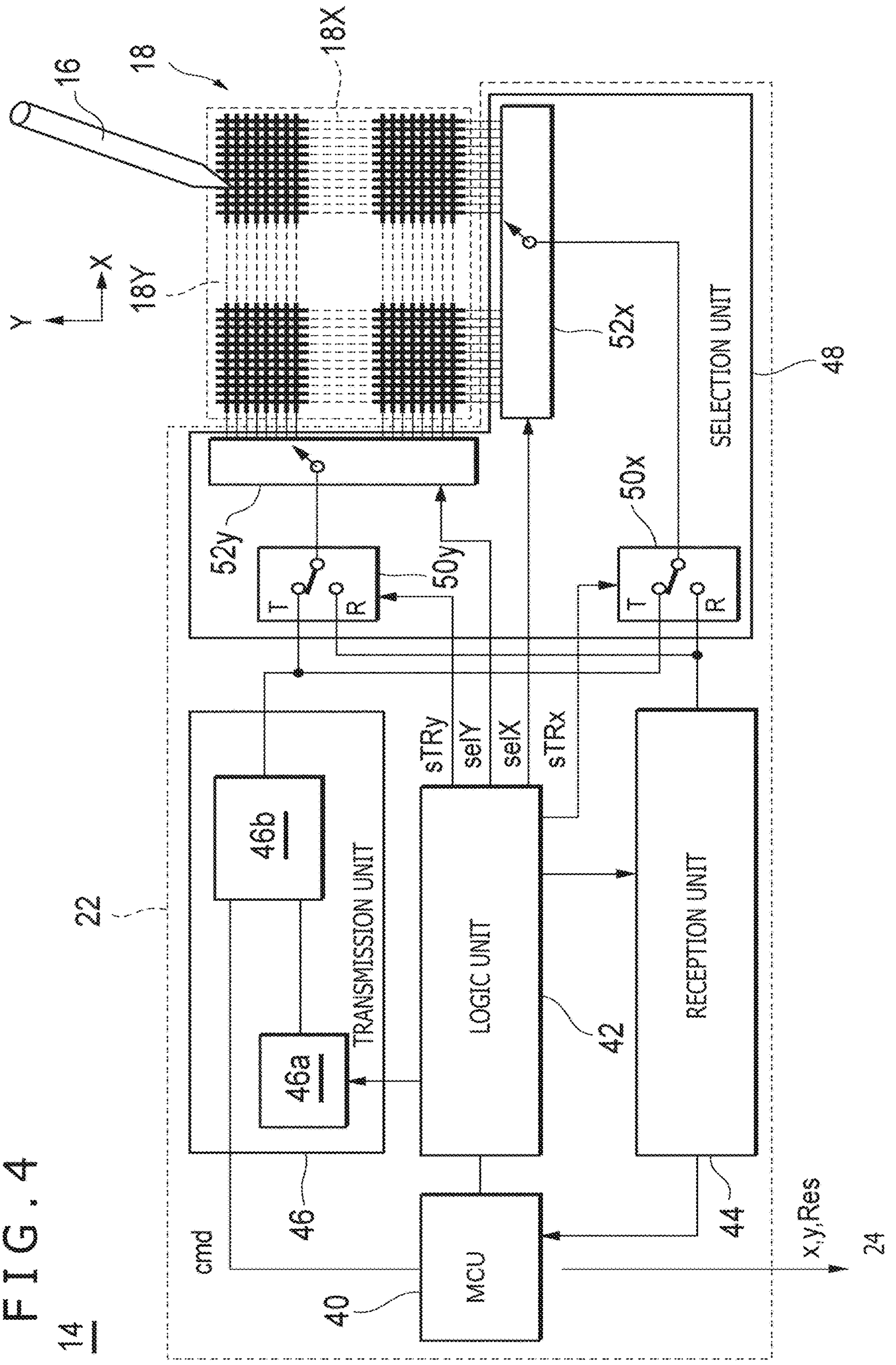
FIG. 4 depicts an example of a circuit configuration in a touch integrated circuit (IC) of FIGS. 1 and 2.

FIG. 4 depicts an example of a circuit configuration in the touch IC 22 of FIGS. 1 and 2. The touch IC 22 is connected to the sensor electrode group 18 (FIG. 2), and the touch IC 22 includes a micro control unit (hereinafter, MCU 40), a logic unit 42, a reception unit 44, a transmission unit 46, and a selection unit 48.

The sensor electrode group 18 includes a plurality of line electrodes 18X (corresponding to "sensor electrodes") for detecting the position in the X direction (X coordinate) and a plurality of line electrodes 18Y (corresponding to "sensor electrodes") for detecting the position in the Y direction (Y coordinate). The line electrodes 18X and 18Y are insulated from each other by an insulating substrate made of glass or resin (not illustrated). The plurality of line electrodes 18X are extended in the Y direction. The plurality of line electrodes 18X are separated from each other in the X direction and arranged at equal intervals. The plurality of line electrodes 18Y are extended in the X direction. The plurality of line electrodes 18Y are separated from each other in the Y direction and arranged at equal intervals.

The MCU 40 and the logic unit 42 control the reception unit 44, the transmission unit 46, and the selection unit 48 to control the transmission and reception operation of the touch IC 22. The MCU 40 is a control unit that reads a program from a memory included in the MCU 40 and executes the program to selectively perform control of receiving the downlink signal DS from the electronic pen 16 and control of transmitting the uplink signal US to the electronic pen 16. Further, the logic unit 42 is configured to generate control signals of the reception unit 44, the transmission unit 46, and the selection unit 48 according to the control by the MCU 40.

The reception unit 44 has a function of receiving the downlink signal DS transmitted from the electronic pen 16 based on the control signal supplied from the logic unit 42. Specifically, the reception unit 44 applies a decoding process to the signal supplied from the selection unit 48 and supplies the obtained digital signal as a reception signal to the MCU 40.

The MCU 40 calculates position coordinates (x, y) of the electronic pen 16 on the touch surface 12 from the reception strength in each of the plurality of line electrodes 18X and 18Y and outputs the position coordinates (x, y) to the host processor 24 when the downlink signal DS is a "position signal" indicating the position of the electronic pen 16. On the other hand, when the downlink signal DS is a "data signal" including transmission data, the MCU 40 acquires response data Res (specifically, unique ID, pen pressure, on/off information of pen switch, and the like) included in the data signal and outputs the response data Res to the host processor 24.

When the MCU 40 transmits the uplink signal US, the MCU 40 generates a command cmd for the electronic pen 16 and supplies the command cmd to the transmission unit 46. The transmission unit 46 has a function of generating the uplink signal US according to the control of the MCU 40 and the logic unit 42. Specifically, the transmission unit 46 includes a code string holding unit 46*a* and a spread processing unit 46*b*.

The code string holding unit 46*a* has a function of generating a spread spectrum code (hereinafter, also simply referred to as a "spread code") with autocorrelation characteristics based on the control signal supplied from the logic unit 42 and holding the spread code. The code string holding unit 46*a* can generate and store spread codes that vary according to the content (such as "P," "0000," and "0001") of the transmission data.

Figure 5:
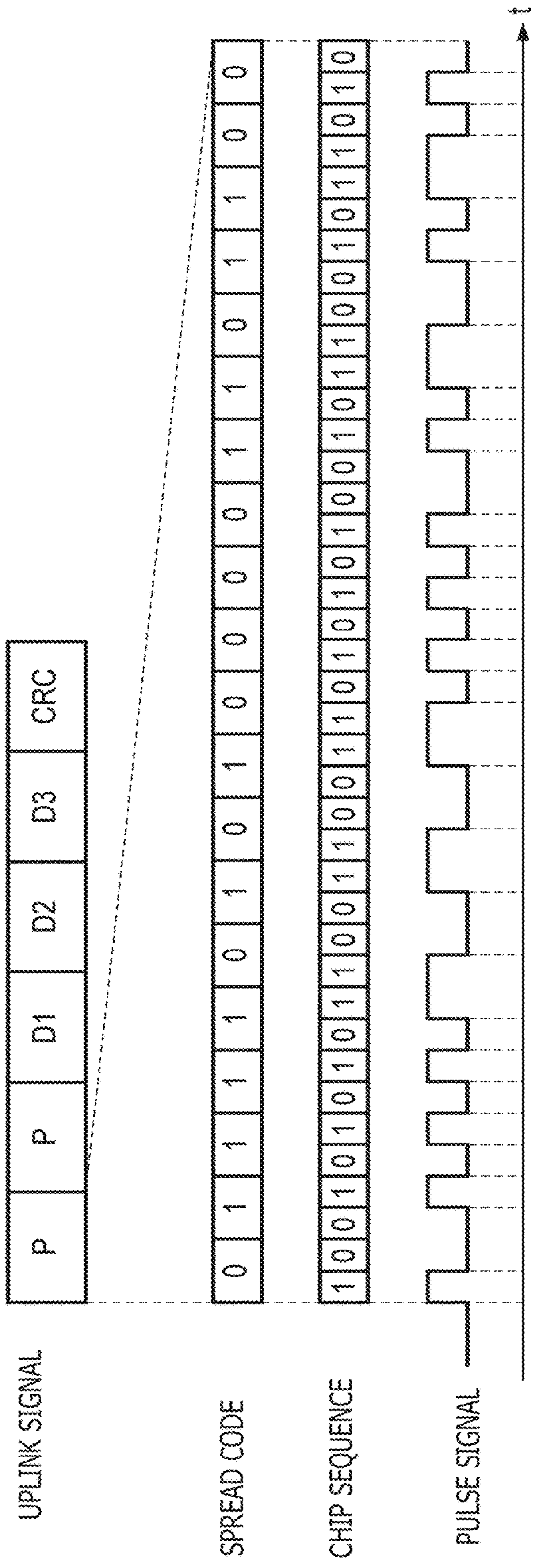
FIG. 5 depicts an example of an uplink signal.

The spread processing unit 46*b* has a function of generating a desirable AC signal (for example, pulse signal, triangle wave signal, and sinusoidal signal) based on the command cmd supplied from the MCU 40. As illustrated in FIG. 5, the spread processing unit 46*b* first generates the uplink signal US from the input command cmd. In the example of FIG. 5, the uplink signal US includes two preambles "P," data "D1, D2 and D3" of 1 byte each, and an error detection signal "CRC." The spread processing unit 46*b* then replaces each of the plurality of pieces of transmission data included in the uplink signal US with spread codes held by the code string holding unit 46*a*. The spread processing unit 46*b* executes a Manchester coding process to generate a binary chip sequence. Lastly, the spread processing unit 46*b* generates a pulse signal corresponding to the chip sequence.

Returning to FIG. 4, the selection unit 48 is connected to the sensor electrode group 18, and the selection unit 48 performs a switch operation according to the control signal from the logic unit 42. Specifically, the selection unit 48 includes two switches 50*x* and 50*y* and two electrode selection circuits 52*x* and 52*y*.

Each of the switches 50*x* and 50*y* is a switch element, in which a common terminal and one of a T terminal and an R terminal are connected. The common terminal of the switch 50*x* is connected to the electrode selection circuit 52*x*. The T terminal is connected to an output end of the transmission unit 46, and the R terminal is connected to an input end of the reception unit 44. The common terminal of the switch 50*y* is connected to the electrode selection circuit 52*y*. The T terminal is connected to the output end of the transmission unit 46, and the R terminal is connected to the input end of the reception unit 44.

The electrode selection circuit 52*x* is a switch element that selectively connects the plurality of line electrodes 18X to the common terminal of the switch 50*x*. More specifically, the electrode selection circuit 52*x* can connect at least some of the plurality of line electrodes 18X to the common terminal of the switch 50*x* at the same time. The electrode selection circuit 52*y* is a switch element that selectively connects the plurality of line electrodes 18Y to the common terminal of the switch 50*y*. More specifically, the electrode selection circuit 52*y* can connect at least some of the plurality of line electrodes 18Y to the common terminal of the switch 50*y* at the same time.

Four control signals sTRx, sTRy, selX, and selY are supplied from the logic unit 42 to the selection unit 48. Specifically, the control signal sTRx is supplied to the switch 50*x*, and the control signal sTRy is supplied to the switch 50*y*. The control signal selX is supplied to the electrode selection circuit 52*x*, and the control signal selY is supplied to the electrode selection circuit 52*y*. The logic unit 42 performs switching control of the selection unit 48 through the four control signals sTRx, sTRy, selX, and selY to selectively transmit the uplink signal US and receive the downlink signal DS.

Operation

The touch IC 22 in the embodiment is configured as described above. Next, a detection operation of the touch IC 22 will be described.

Figure 6:
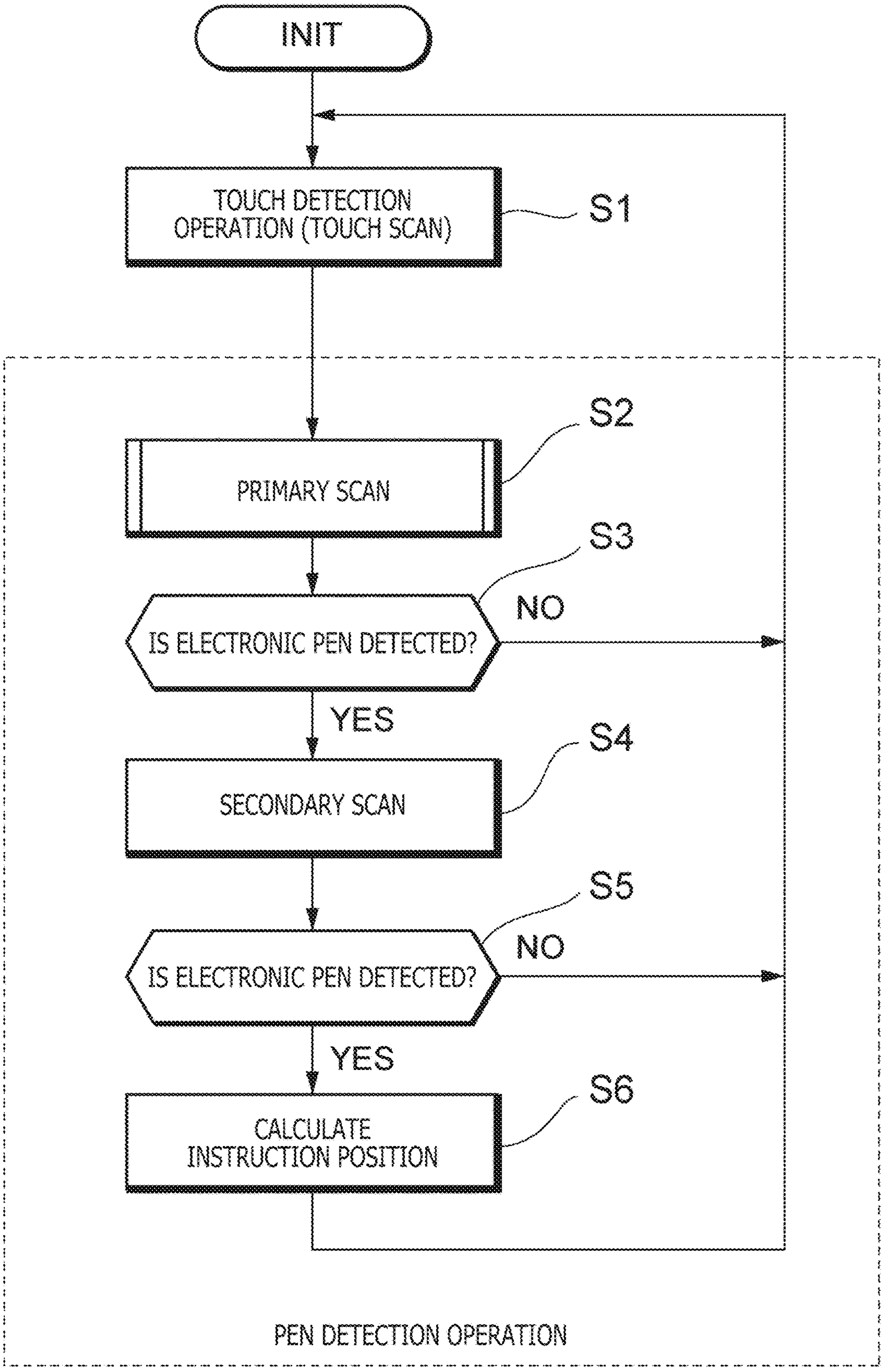
FIG. 6 is a flow chart illustrating a detection operation of a human body and the electronic pen.

FIG. 6 is a flow chart illustrating a detection operation of the human body BD and the electronic pen 16. Step S1 relates to a "touch detection operation" of detecting a touch by the human body BD. On the other hand, the remaining steps S2 to S6 relate to a "pen detection operation" of detecting the electronic pen 16.

In step S1, the touch IC 22 performs a "touch scan" for detecting a finger or a palm of the human body BD. When a finger or a palm is detected, the touch IC 22 calculates position information (coordinates or region) indicating the position of the finger or the palm. Hereinafter, an operation of the touch scan will be described.

The logic unit 42 of FIG. 4 controls the switch 50*x* to connect the T terminal to the common terminal and controls the switch 50*y* to connect the R terminal to the common terminal. The logic unit 42 further controls the electrode selection circuits 52*x* and 52*y* to sequentially select combinations of the plurality of line electrodes 18X and 18Y. In this way, the reception unit 44 sequentially receives human body detection signals passing through a plurality of intersections formed by the plurality of line electrodes 18X and 18Y.

The MCU 40 calculates the positions of the finger and the palm in a sensor region of the touch sensor 20 based on the reception strength of the human body detection signals sequentially received in the touch scan. More specifically, the MCU 40 calculates the area of a region with consecutive intersections where the reception strength of the human body detection signals is equal to or greater than a predetermined value. The MCU 40 calculates the position as a "finger" in a case where the obtained area is equal to or smaller than a predetermined value and calculates the position as a "palm" in other cases. Note that the position of the palm may be expressed as a region having an area, instead of as points.

In step S2 of FIG. 6, the touch IC 22 executes a "primary scan" for detecting the presence of the electronic pen 16 in a relatively large (wide) range. The primary scan will be described in detail later with reference to a flow chart of FIG. 7.

In step S3, the touch IC 22 checks the result of the detection for the presence of the electronic pen 16 in the primary scan executed in step S2. If the electronic pen 16 is not detected (step S3: NO), the touch IC 22 returns to step S1 and repeatedly executes the flow chart. On the other hand, if the electronic pen 16 is detected (step S3: YES), the touch IC 22 proceeds to the following step S4.

In step S4, the touch IC 22 executes a "secondary scan" for detecting the electronic pen 16 in a relatively small (narrow) range. The secondary scan will be described in detail later with reference to a flow chart of FIG. 18.

In step S5, the touch IC 22 checks the result of the detection for the presence of the electronic pen 16 in the secondary scan executed in step S4. If the electronic pen 16 is not detected (step S5: NO), the touch IC 22 returns to step S1 and repeatedly executes the flow chart. On the other hand, if the position of the electronic pen 16 is detected (step S5: YES), the touch IC 22 proceeds to the following step S6.

In step S6, the touch IC 22 calculates, as the indication position of the electronic pen 16, the peak position of the signal distribution obtained in the secondary scan of step S4. For example, the touch IC 22 repeats one-dimensional model calculation twice to estimate an X-axis coordinate value and a Y-axis coordinate value and supplies the coordinate values (X, Y) of the indication position to the host processor 24. Alternatively, the touch IC 22 may perform two-dimensional model calculation once to estimate the coordinate values (X, Y) of the indication position at the same time and supply the coordinate values (X, Y) to the host processor 24.

After executing step S6, the touch IC 22 returns to step S1 and repeatedly executes the flow chart. In this way, the touch IC 22 alternately executes the touch detection operation of detecting the contact of the human body BD on the touch sensor 20 and the pen detection operation of detecting the electronic pen 16.

Figure 7:
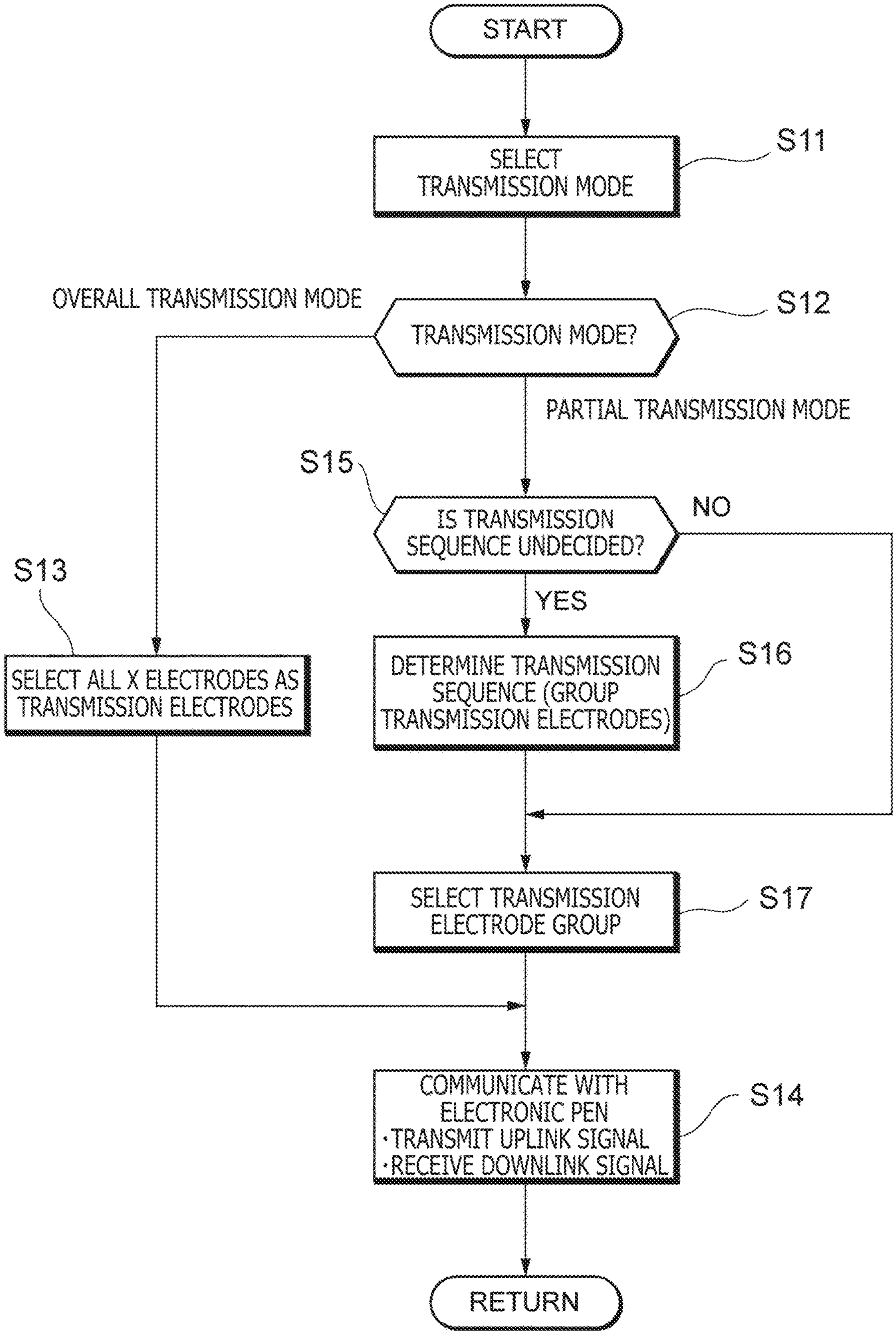
FIG. 7 is a detailed flow chart related to step S2 (primary scan) of FIG. 6.

FIG. 7 is a detailed flow chart related to step S2 (primary scan) of FIG. 6. It should be noted that the electronic pen 16 is scanned here throughout the entire range in one direction (here, X direction).

In step S11, the touch IC 22 selects a transmission mode of the uplink signals US. Among a plurality of types of transmission modes, one of an "overall transmission mode" and a "partial transmission mode" described later is selected in a case illustrated here. For example, the touch IC 22 may select the transmission mode according to the result of the touch scan in step S1 of FIG. 6. Specifically, the "overall transmission mode" is selected when the contact of the human body BD is not detected, and the "partial transmission mode" is selected when the contact of the human body BD is detected.

In step S12, the touch IC 22 checks the transmission mode selected in step S11. For example, if the overall transmission mode is selected (step S12: overall transmission mode), the touch IC 22 proceeds to the following step S13.

In step S13, the touch IC 22 selects all of the line electrodes 18X as sensor electrodes (hereinafter, referred to as "transmission electrodes") to be used to transmit the uplink signals US.

Figure 8:
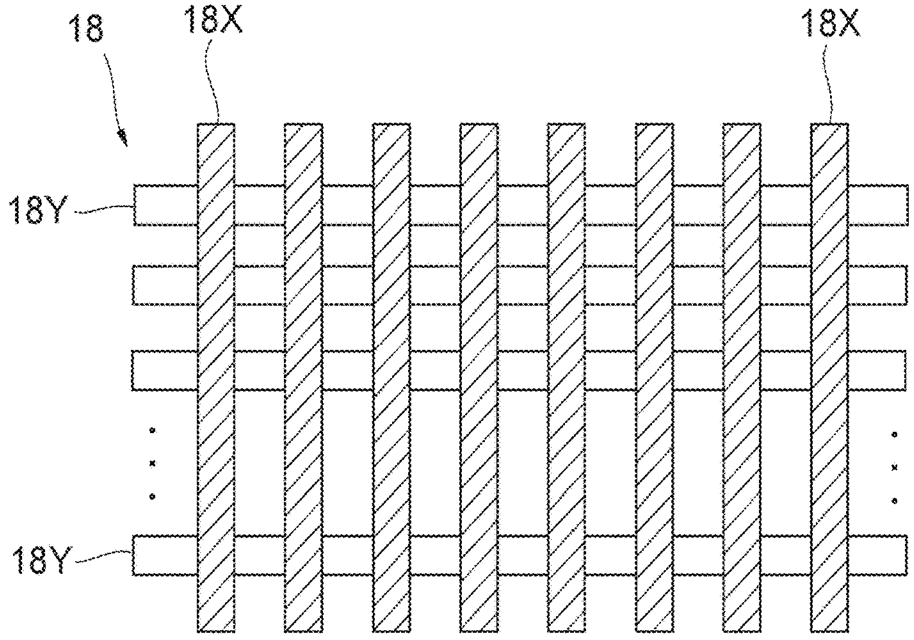
FIG. 8 depicts a selection result of transmission electrodes in an overall transmission mode.

FIG. 8 depicts a selection result of transmission electrodes in the overall transmission mode. Rectangles extending in the vertical direction represent the line electrodes 18X, and rectangles extending in the horizontal direction represent the line electrodes 18Y. Hatched rectangles correspond to the transmission electrodes of the uplink signals US. As can be understood from FIG. 8, all of the line electrodes 18X are selected as transmission electrodes.

In step S14 of FIG. 7, the touch IC 22 attempts to communicate with the electronic pen 16 near the touch sensor 20. Specifically, the touch IC 22 transmits the uplink signals US generated by the touch IC 22 to the electronic pen 16 and receives the downlink signal DS from the electronic pen 16. Note that the uplink signals US are transmitted through the transmission electrodes selected in step S13.

On the other hand, if the partial transmission mode is selected in step S12 of FIG. 7 (step S12: partial transmission mode), the touch IC 22 proceeds to step S15 unlike in the case of the overall transmission mode.

In step S15, the touch IC 22 checks whether or not the transmission sequence of the uplink signals US is undecided. If the transmission sequence is already decided (step S15: NO), the touch IC 22 skips step S16 and proceeds to step S17. On the other hand, if the transmission sequence is undecided (step S15: YES), the touch IC 22 proceeds to the following step S16.

In step S16, the touch IC 22 determines the transmission sequence of the uplink signals US. The "transmission sequence" denotes a series of operations for executing time-division transmission of the uplink signals US. Here, the touch IC 22 determines a combination of a group of transmission electrodes and an order of selection.

Figure 9:
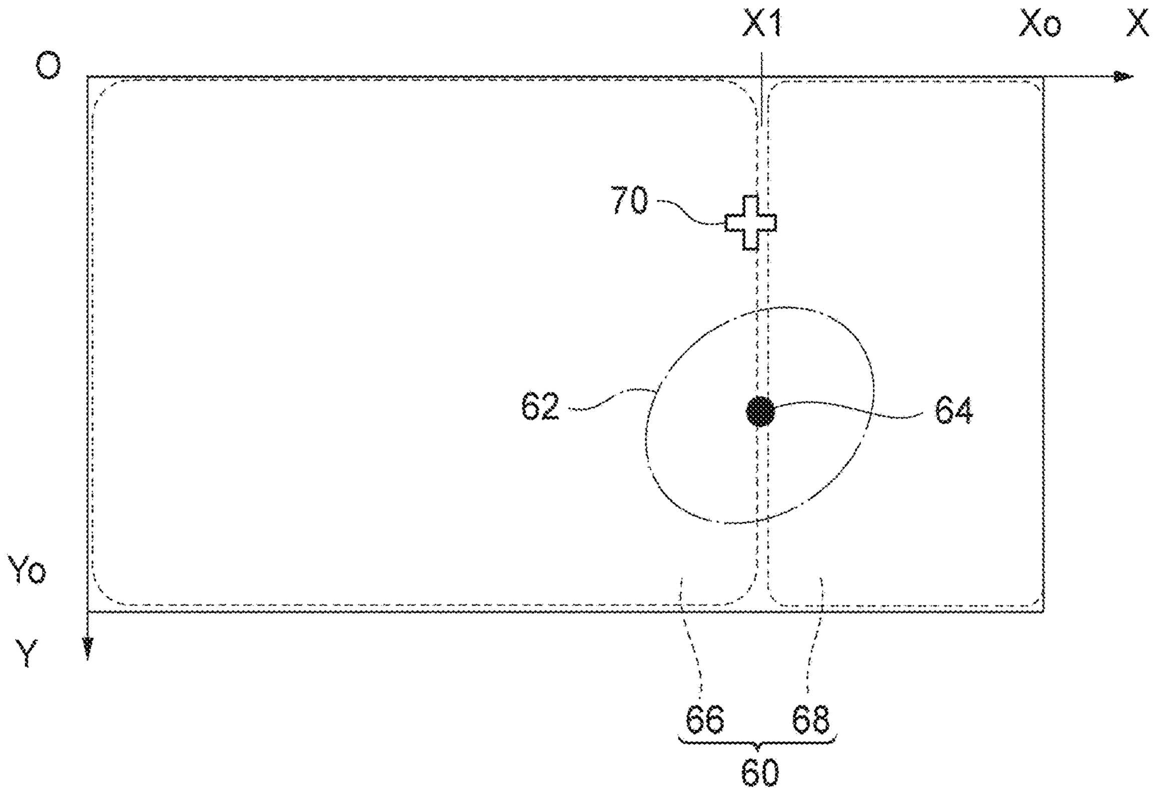
FIG. 9 depicts an example of a selection result of transmission electrodes in a partial transmission mode.

FIG. 9 depicts an example of a selection result of transmission electrodes in the partial transmission mode. FIG. 9 schematically illustrates a sensor region 60 defined on a sensor coordinate system. The sensor region 60 here denotes a region in which the sensor electrode group 18 included in the touch sensor 20 can detect the position. Further, the sensor coordinate system is a two-dimensional Cartesian coordinate system including an X-axis and a Y-axis where O is an origin. The origin O is a feature point (for example, upper left vertex) on the touch surface 12 (FIG. 1). In FIG. 9, the sensor region 60 is a rectangular region including four vertexes (0, 0), (X0, 0), (X0, Y0), and (0, Y0).

For example, in a use case illustrated here, the user fixes the hand holding the electronic pen 16 on the touch surface 12 and performs a writing operation. In this case, a contact region 62 is detected in the sensor region 60 due to a touch by the side surface closer to the little (pinky) finger. Assuming that the X coordinate at a representative position (hereinafter, referred to as a "contact position 64") of the contact region 62 is X1, the entire sensor region 60 is divided into two subregions 66 and 68 at a boundary line X=X1. That is, the subregion 66 is a region satisfying "0≤X<X1," and the subregion 68 is a region satisfying "X1≤X≤X0."

Hereinafter, it is assumed that the touch IC 22 sets the subregion 66 as a group G1 which is first in the order of selection and sets the subregion 68 as a group G2 which is second in the order of selection. For example, the number of line electrodes 18X in the subregion 66 is L1, and the number of line electrodes 18X in the subregion 68 is L2 (=N−L1).

In step S17 of FIG. 7, the touch IC 22 selects one group (hereinafter, also referred to as a "transmission electrode group") from the two groups G1 and G2 according to the transmission sequence determined in step S16. The touch IC 22 then attempts to communicate with the electronic pen 16 near the touch sensor 20 (step S14).

In this way, the execution of the detailed flow chart illustrated in FIG. 7 is finished. When the partial transmission mode is continuously selected, the touch IC 22 repeatedly executes the flow chart to control the transmission of the uplink signals US in a time-division manner. As a result, a desirable transmission sequence is executed.

Figure 10:
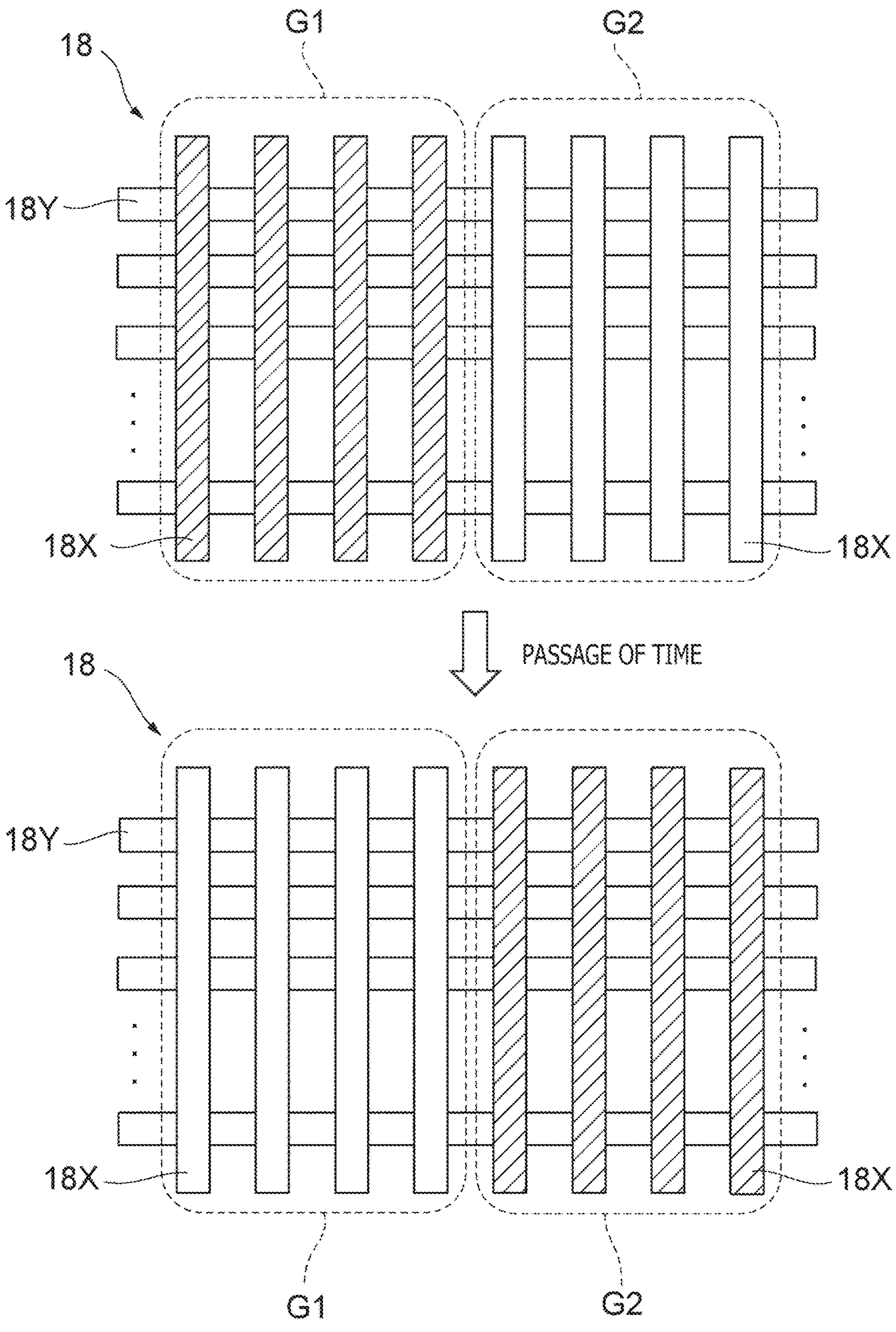
FIG. 10 depicts a transmission sequence executed based on the selection result of FIG. 9.

FIG. 10 depicts the transmission sequence executed based on the selection result of FIG. 9. More specifically, FIG. 10 is an enlarged view of the surroundings of the contact position 64 (X=X1). First, the touch IC 22 performs control of transmitting the uplink signals US1 from L1 line electrodes 18X belonging to the group G1. After a predetermined time from the end of the series of processes, the touch IC 22 performs control of transmitting the uplink signals US2 from L2 line electrodes 18X belonging to the group G2. The touch IC 22 selects the two groups G1 and G2 in turn to execute the time-division transmission of the uplink signals US1 and US2.

<Conclusion>

As described above, the touch IC 22 is used along with the electronic pen 16 including M pen electrodes and is connected to the electrostatic-capacitance touch sensor 20 including N sensor electrodes (here, N line electrodes 18X). The touch IC 22 then selects L (1<L<N) transmission electrodes from the N line electrodes 18X and performs control of changing the transmission electrodes of the uplink signals US according to time.

That is, by actively changing the transmission position or the transmission time of the uplink signals US, it is likely that the reception circuit will function as intended even if the reception circuit locally and suddenly becomes non-function due to a delicate balance between the pen electrode of the electronic pen 16 and the contact area of the human body BD. The effect will be described with reference to FIGS. 9, 11, and 12. As illustrated in FIG. 9, it is assumed that an indication position 70 of the electronic pen 16 in the X direction is around X=X1, and the electronic pen 16 can receive both of uplink signals US1 and US2.

Figure 11:
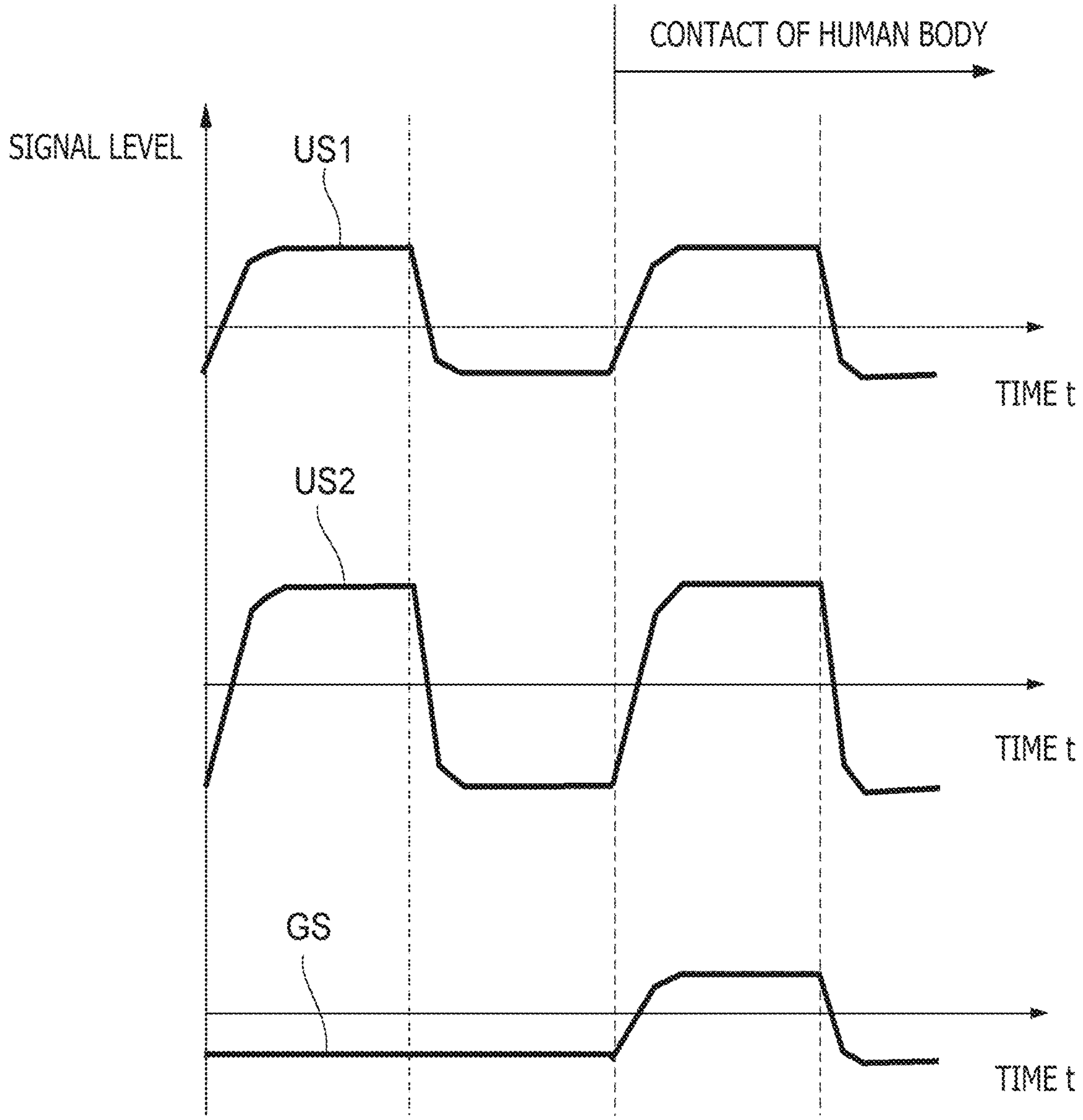
FIG. 11 schematically depicts an effect of time-division transmission of uplink signals.
Figure 12:
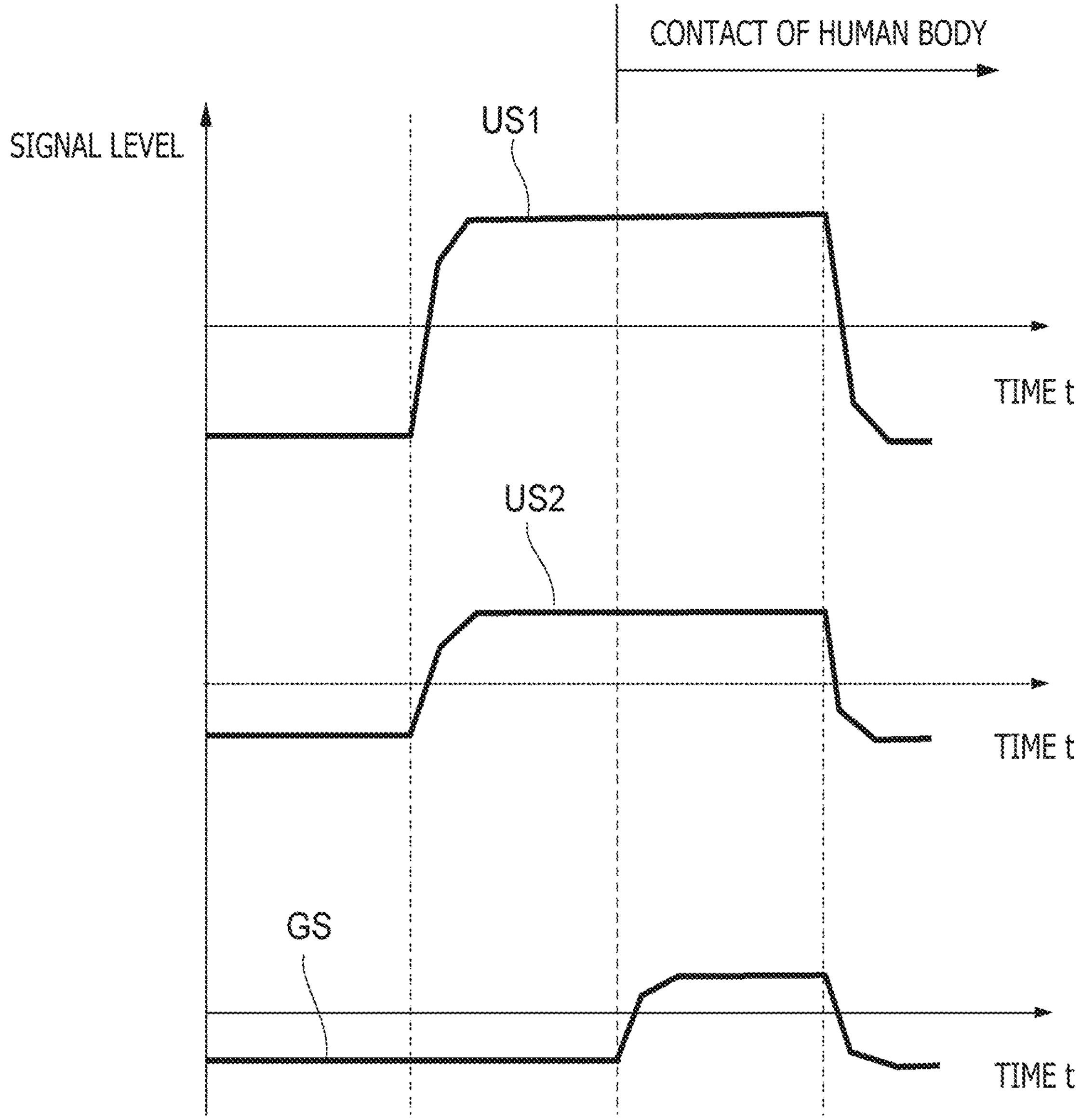
FIG. 12 schematically depicts an effect of time-division transmission of uplink signals.

As illustrated in FIG. 11, in the GND potential of the electronic pen 16, the signal level changes according to the waveform of the uplink signal US when the human body BD is in contact with the touch surface 12 (during reception of third and fourth bits). As a result, the reception circuit of the electronic pen 16 cannot correctly detect one uplink signal US1 (first data DAT1) but can correctly detect the other uplink signal US2 (second data DAT2). In another case, the reception circuit of the electronic pen 16 cannot correctly detect one uplink signal US2 (second data DAT2) but can correctly detect the other uplink signal US1 (first data DAT1) as illustrated in FIG. 12. This prevents the signal led to the pen electrode included in the electronic pen 16 from becoming temporarily undetectable due to the fluctuations of the GND potential caused by the signal led to the human body BD.

In addition, the touch IC 22 may select L transmission electrodes so as to partially include the contact region 62 of the human body BD on the touch sensor 20. The touch IC 22 may classify N line electrodes 18X into G (G ≥2) groups and select, as transmission electrodes, L line electrodes 18X belonging to one or more groups selected in turn according to time. In this case, the touch IC 22 may divide and allocate two or more line electrodes 18X positioned in the contact region 62 to G groups, respectively.

Other Operation Examples of Touch IC 22

Next, other operation examples of the touch IC 22 will be described with reference to FIGS. 13 to 21.

First Example

Figure 13:
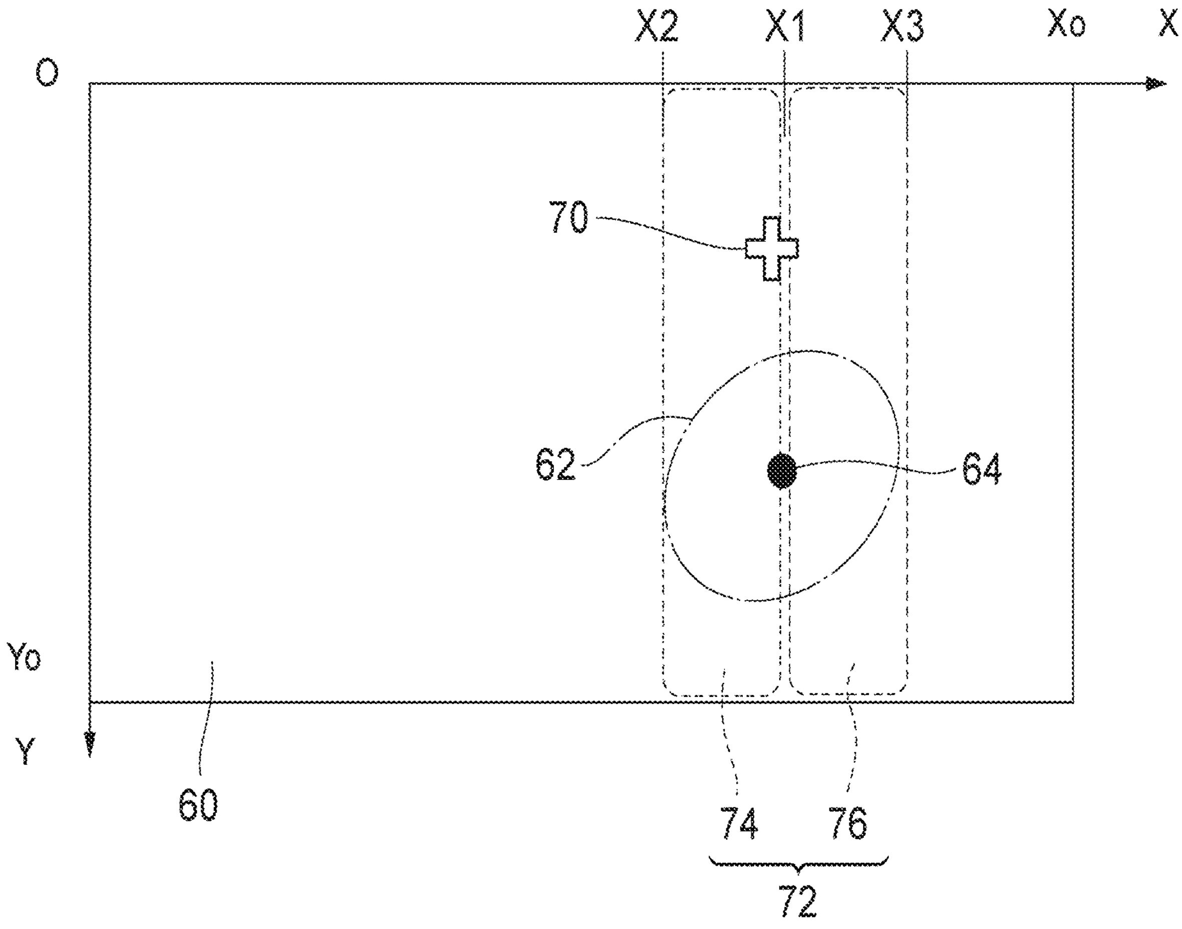
FIG. 13 depicts a selection result of transmission electrodes in a first example.

FIG. 13 depicts a selection result of transmission electrodes in a first example. In the example, only the line electrodes 18X in part (hereinafter, referred to as a subregion 72) of the entire sensor region 60 are selected as transmission electrodes in the transmission sequence of the uplink signals US. The subregion 72 is a region satisfying X2≤X≤X3 and including the contact region 62. Here, X=X2 corresponds to the position at the left end of the contact region 62, and X=X3 corresponds to the position at the right end of the contact region 62. The subregion 72 is divided into two subregions 74 and 76 at a boundary line X=X1. More specifically, the subregion 74 is a region satisfying X2≤X<X1, and the subregion 76 is a region satisfying X1≤X≤X3.

Figure 14:
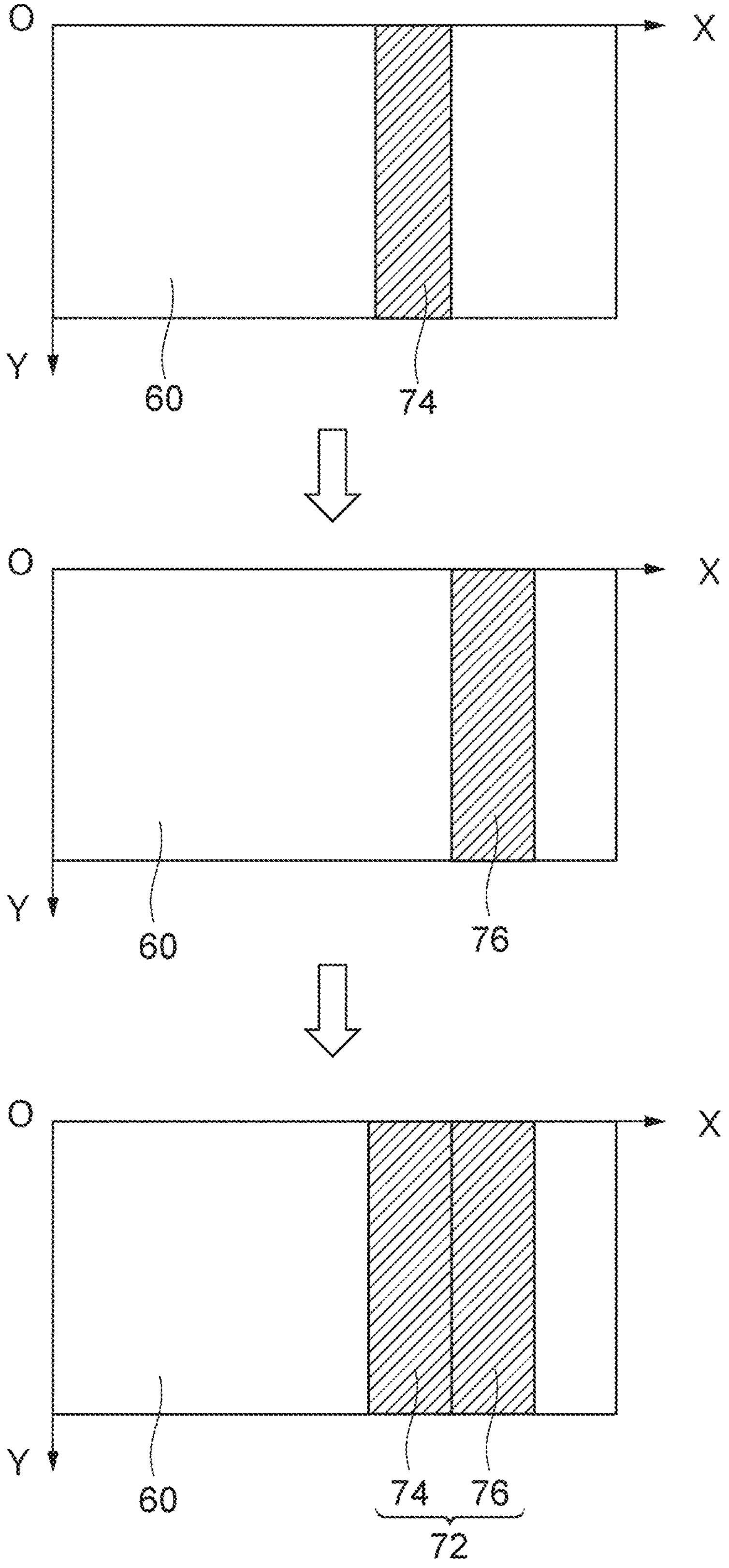
FIG. 14 depicts a transmission sequence executed based on the selection result of FIG. 13.

FIG. 14 depicts a transmission sequence executed based on the selection result of FIG. 13. It is assumed here that the subregion 74 is set as a "first group" which is first in the order of selection. The subregion 76 is set as a "second group" which is second in the order of selection. The subregion 72 is set as a "third group" which is third in the order of selection. For example, the number of line electrodes 18X in the subregion 72 is K (where 1<K<N), and the number of line electrodes 18X in the subregion 72 is K/2.

In this case, the touch IC 22 first performs control of transmitting uplink signals US1 from (K/2) line electrodes 18X in the subregion 74. After a predetermined time from the end of the series of processes involving the first group, the touch IC 22 performs control of transmitting uplink signals US2 from (K/2) line electrodes 18X in the subregion 76. After a predetermined time from the end of the series of processes involving the second group, the touch IC 22 performs control of transmitting uplink signals US3 from K line electrodes 18X in the subregion 72. The touch IC 22 selects the three groups in turn to execute the time-division transmission of the uplink signals US1 to US3.

Figure 15:
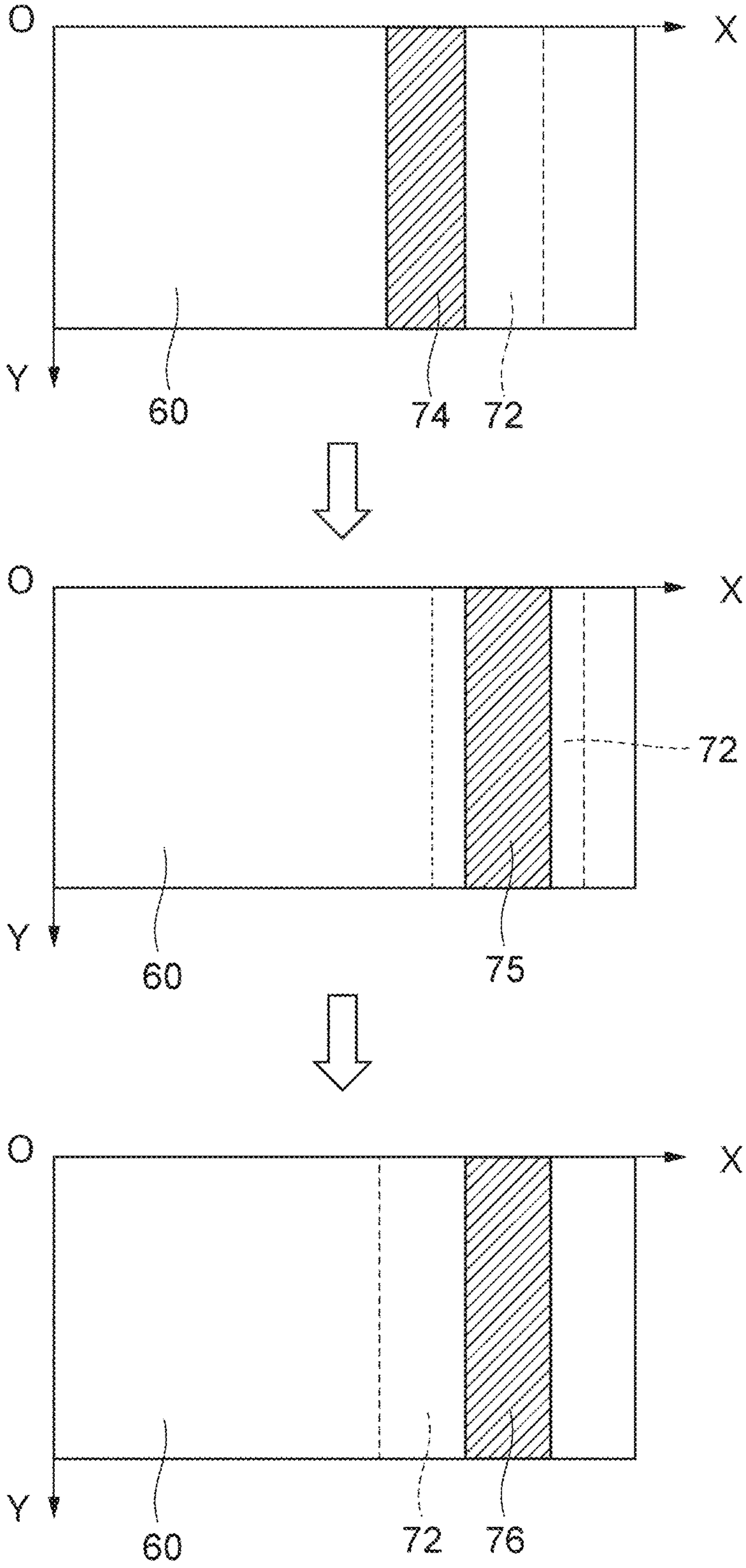
FIG. 15 depicts a transmission sequence different from FIG. 14.

FIG. 15 depicts a transmission sequence different from FIG. 14. It is assumed here that the subregion 74 is set as a first group. A subregion 75 is set as a second group. The subregion 76 is set as a third group. The subregion 75 is a region obtained by combining a right half of the subregion 74 and a left half of the subregion 76.

In this case, the touch IC 22 first performs control of transmitting uplink signals US1 from (K/2) line electrodes 18X in the subregion 74. After a predetermined time from the end of the series of processes involving the first group, the touch IC 22 performs control of transmitting uplink signals US2 from (K/2) line electrodes 18X in the subregion 75. After a predetermined time from the end of the series of processes involving the second group, the touch IC 22 performs control of transmitting uplink signals US3 from (K/2) line electrodes 18X in the subregion 76.

The touch IC 22 selects the three groups in turn to execute the time-division transmission of the uplink signals US1 to US3. As a result, the touch IC 22 transmits the uplink signals US while gradually moving the subregions 74 to 76 with substantially equal areas.

In this way, the touch IC 22 may classify K line electrodes 18X satisfying L≤K<N among N sensor electrodes (N line electrodes 18X here) into G groups and select L transmission electrodes belonging to one or more groups selected in turn according to time. Particularly, when the touch sensor 20 is a mutual-capacitance sensor, the K line electrodes 18X may be electrodes arranged in a row (in a line) in the contact region 62 or at positions around the contact region 62.

Second Example

Figure 16:
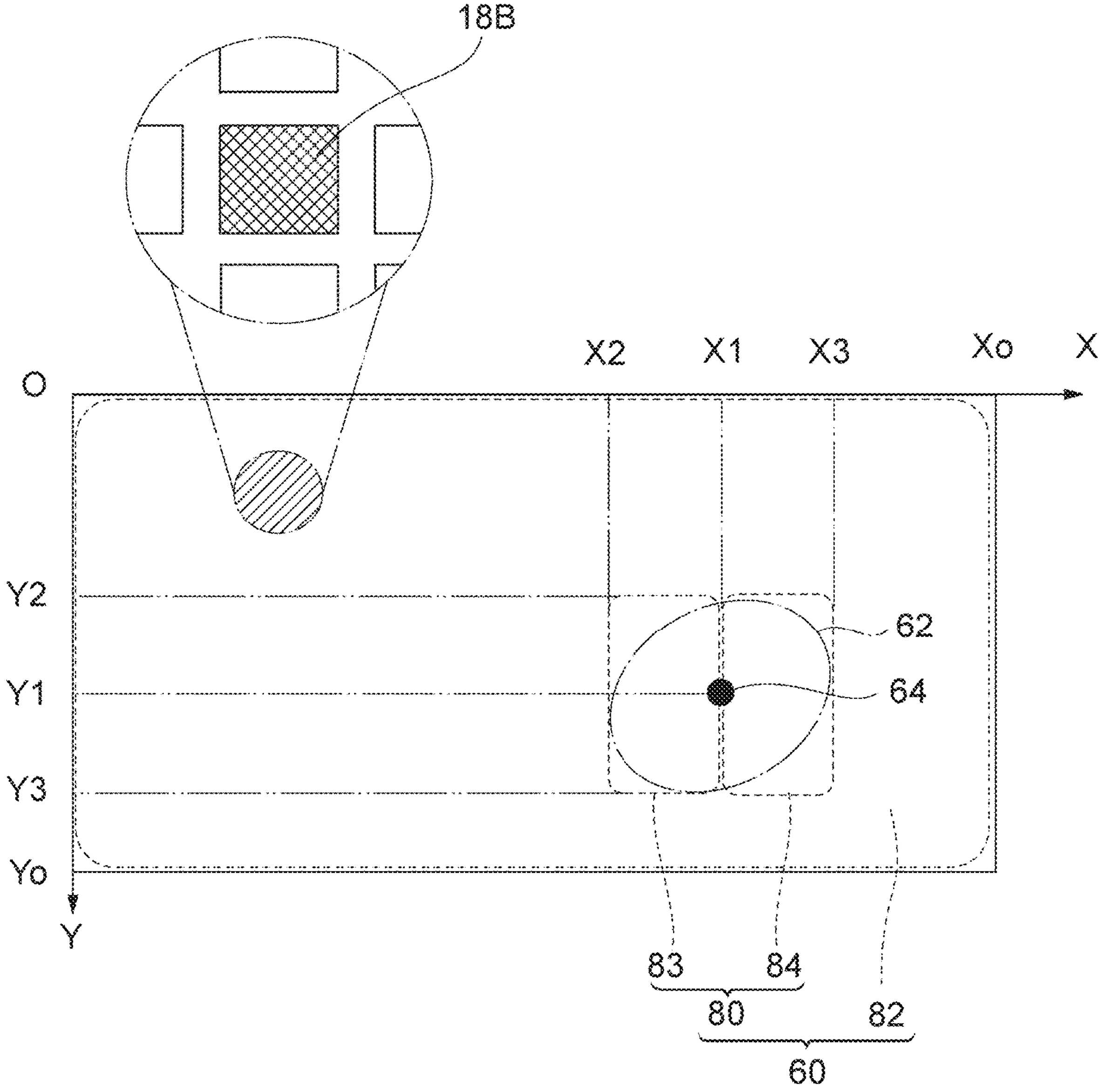
FIG. 16 depicts a selection result of transmission electrodes in a second example.

FIG. 16 depicts a selection result of transmission electrodes in a second example. In the example illustrated here, the touch sensor 20 is a self-capacitance sensor including square block electrodes 18B arranged in a two-dimensional grid pattern. In the transmission sequence of the uplink signals US here, only the block electrodes 18B in part (hereinafter, referred to as a subregion 80) of the entire sensor region 60 are selected as transmission electrodes. On the other hand, the block electrodes 18B are not selected as transmission electrodes in a remaining region 82, which is a region, which remains after excluding the subregion 80 from the sensor region 60.

The subregion 80 is a region satisfying (X2≤X≤X3) AND (Y2≤Y≤Y3) and including the contact region 62. Here, the coordinates of the contact position 64 are (X1, Y1). Y=Y2 corresponds to the position at the upper end of the contact region 62, and Y=Y3 corresponds to the position at the lower end of the contact region 62. The subregion 80 is divided into subregions 83 and 84 at a boundary line X=X1. More specifically, the subregion 83 is a region satisfying (X2≤X<X1) AND (Y2≤Y≤Y3), and the subregion 83 is a region satisfying (X1≤X≤X3) AND (Y2≤Y≤Y3).

Figure 17:
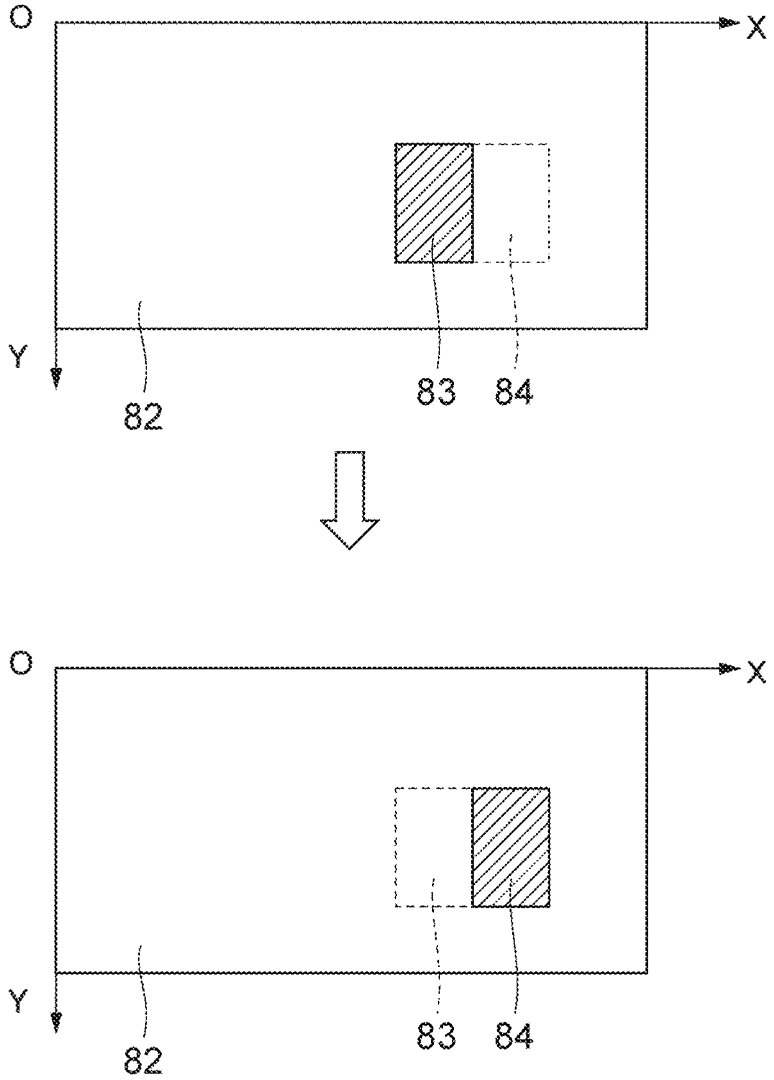
FIG. 17 depicts a transmission sequence executed based on the selection result of FIG. 16.

FIG. 17 depicts a transmission sequence executed based on the selection result of FIG. 16. It is assumed here that the subregion 83 is set as a first group and the subregion 84 is set as a second group. For example, the number of block electrodes 18B in the subregion 80 is K, and the number of block electrodes 18B in each of the subregions 83 and 84 is (K/2).

In this case, the touch IC 22 first performs control of transmitting uplink signals US1 from (K/2) block electrodes 18B in the subregion 83. After a predetermined time from the end of the series of processes involving the first group, the touch IC 22 performs control of transmitting uplink signals US2 from LA block electrodes 18B in the subregion 84. The touch IC 22 selects the two groups in turn to execute the time-division transmission of the uplink signals US1 and US2.

In this way, the touch IC22 may classify K sensor electrodes satisfying L≤K<N among N sensor electrodes (N block electrodes 18B here) into G groups and select L transmission electrodes belonging to one or more groups selected in turn according to time. Particularly, when the touch sensor 20 is a self-capacitance sensor, the K block electrodes 18B may be electrodes arranged in a row (in a line) in the contact region 62 or at positions around the contact region 62.

Third Example

Although the touch IC 22 selects the transmission mode according to the result of the touch scan in step S11 of FIG. 7, the method is not limited to such configuration. For example, when the electronic pen 16 can transmit a control signal for switching the transmission electrodes of the touch sensor 20 to the touch IC 22, the touch IC 22 may switch the transmission electrodes in response to the reception of the control signal. In this way, the touch IC 22 can switch the transmission electrodes at more suitable timing in cooperation with the electronic pen 16 as a communication partner.

Fourth Example

Figure 18:
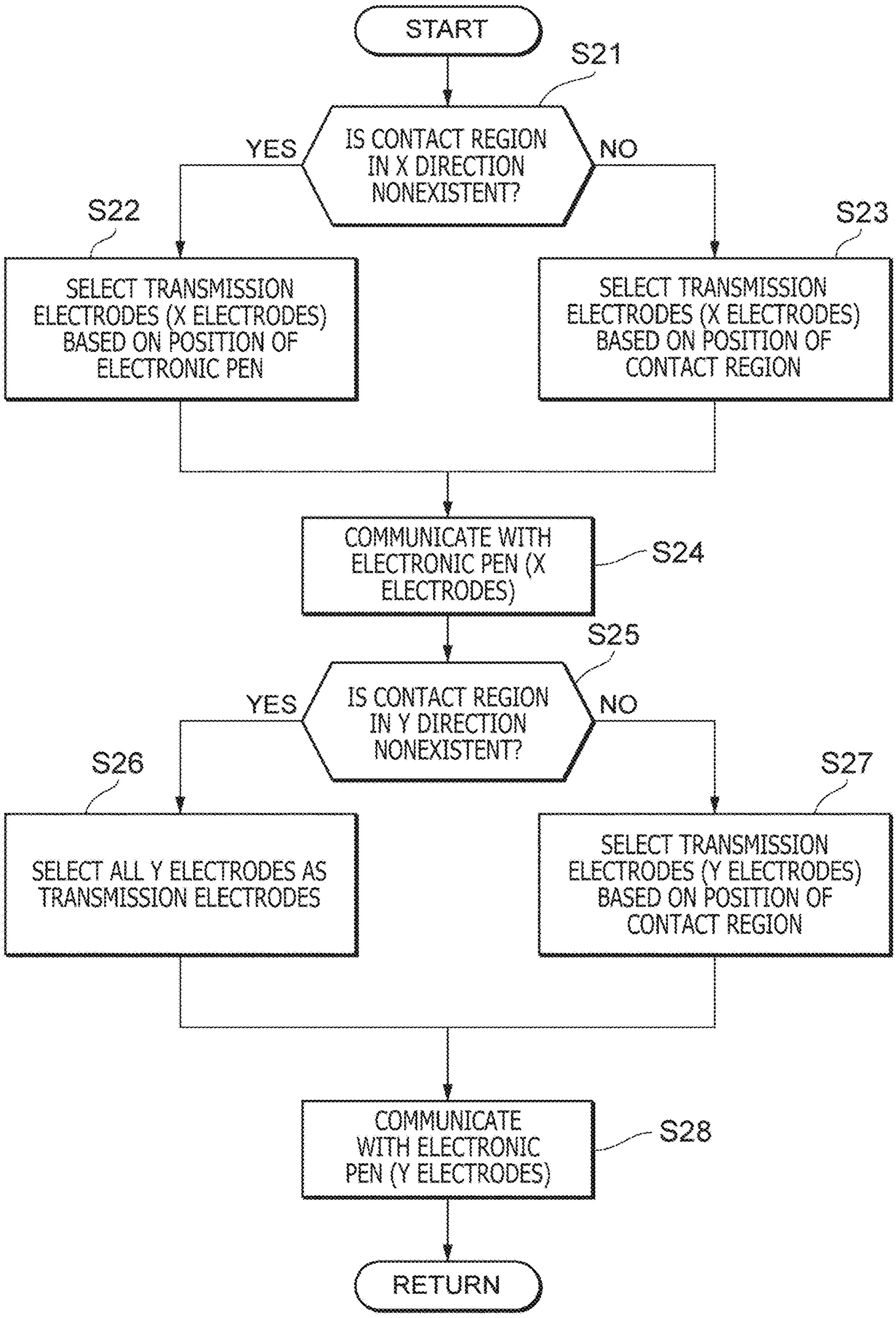
FIG. 18 is a detailed flow chart related to step S4 (secondary scan) of FIG. 6.

FIG. 18 is a detailed flow chart related to step S4 (secondary scan) of FIG. 6. In the case illustrated here, the electronic pen 16 is detected in the primary scan.

In step S21, the touch IC 22 checks whether or not the contact region 62 is nonexistent in the X direction based on the execution result of the touch scan (step S1 of FIG. 6). If the contact region 62 is nonexistent (step S21: YES), the touch IC 22 proceeds to step S22. On the other hand, if the contact region 62 exists (step S21: NO), the touch IC 22 proceeds to step S23.

In step S22, the touch IC 22 selects transmission electrodes of the uplink signals US from all of the line electrodes 18X based on the position of the electronic pen 16.

Figure 19:
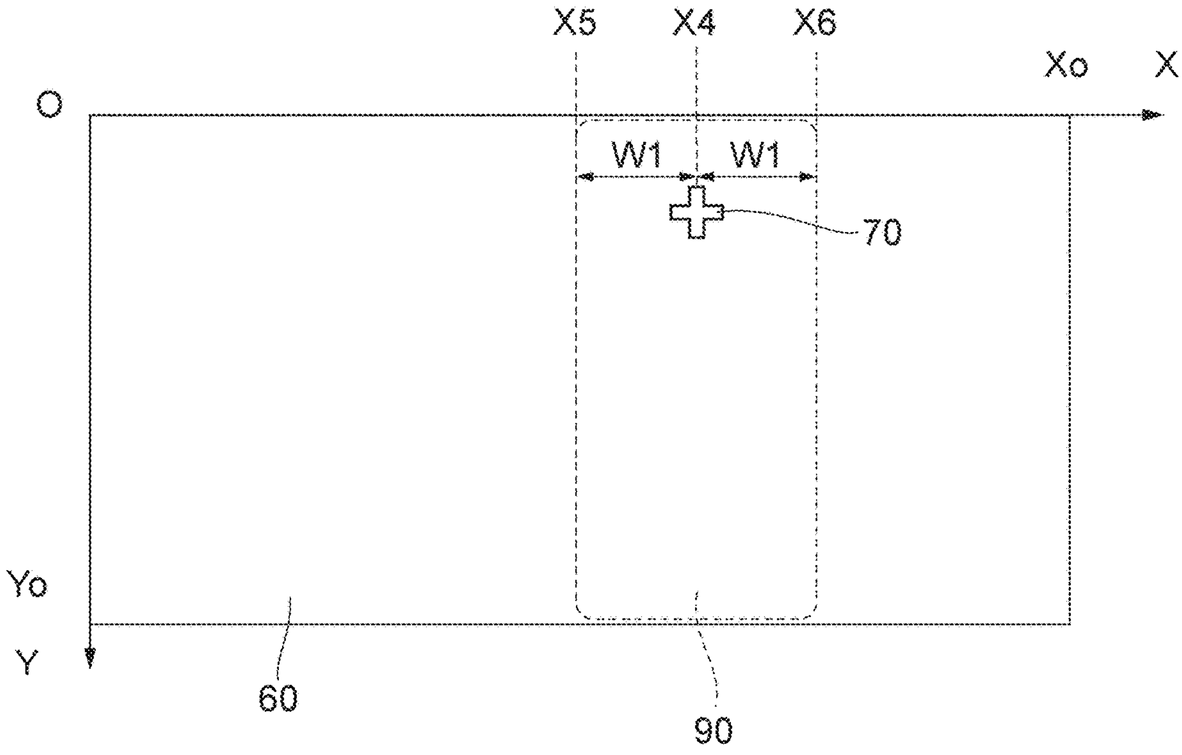
FIG. 19 depicts an example of a selection result of transmission electrodes based on the position of the electronic pen.

FIG. 19 depicts an example of a selection result of transmission electrodes based on the position of the electronic pen 16. In the example, only the line electrodes 18X in part (that is, a subregion 90) of the entire sensor region 60 are selected as transmission electrodes. The subregion 90 corresponds to a distance range within W1 based on the indication position 70 (X=X4) of the electronic pen 16. More specifically, the subregion 90 is a region satisfying X5≤X≤X6, where X5=X4−W1 and X6=X4+W1.

On the other hand, in step S23, the touch IC 22 selects transmission electrodes of the uplink signals US from all of the line electrodes 18X based on the position of the contact region 62. The selection method will be described with reference to FIGS. 20 and 21.

Figure 20:
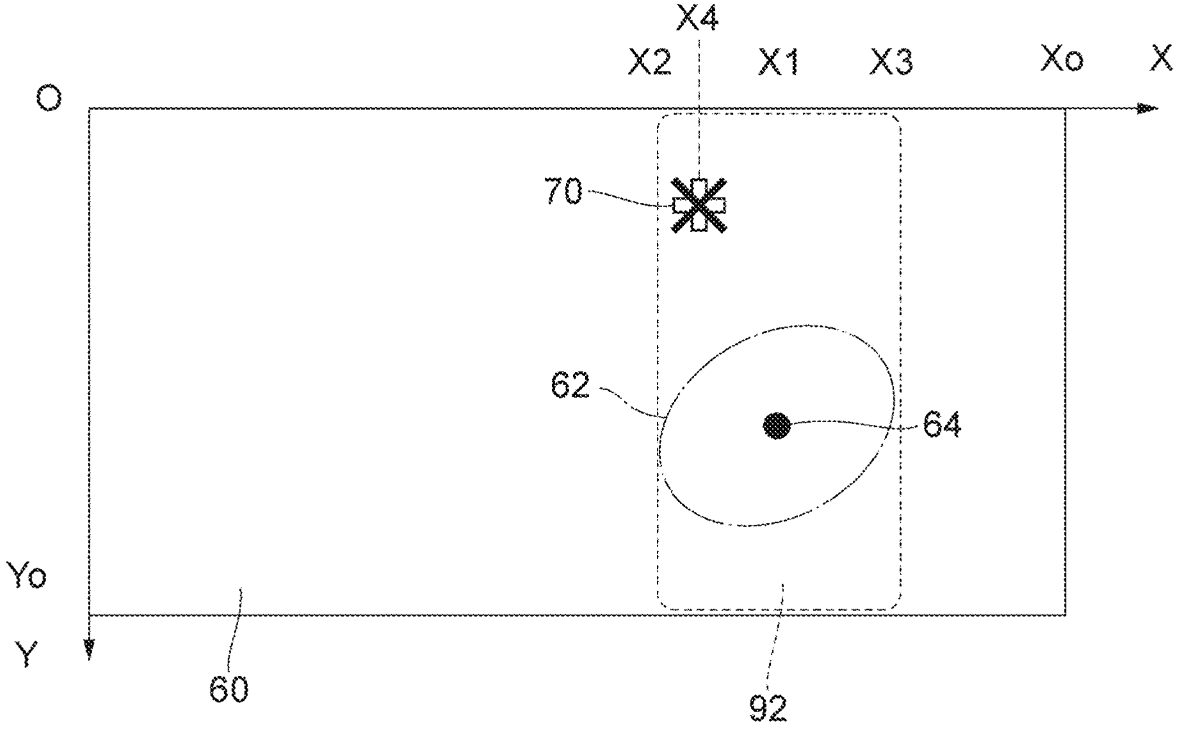
FIG. 20 depicts an example of a selection result of transmission electrodes based on the position of a contact region.

FIG. 20 depicts an example of a selection result of transmission electrodes based on the position of the contact region 62. In the example, only the line electrodes 18X in part (that is, a subregion 92) of the entire sensor region 60 are selected as transmission electrodes. The subregion 92 is a region satisfying X2≤X≤X3 and including the contact region 62. Here, X=X2 corresponds to the position at the left end of the contact region 62, and X=X3 corresponds to the position at the right end of the contact region 62. Therefore, the position or the size of the subregion 92 does not depend on the indication position 70 of the electronic pen 16 in the example of FIG. 20.

Figure 21:
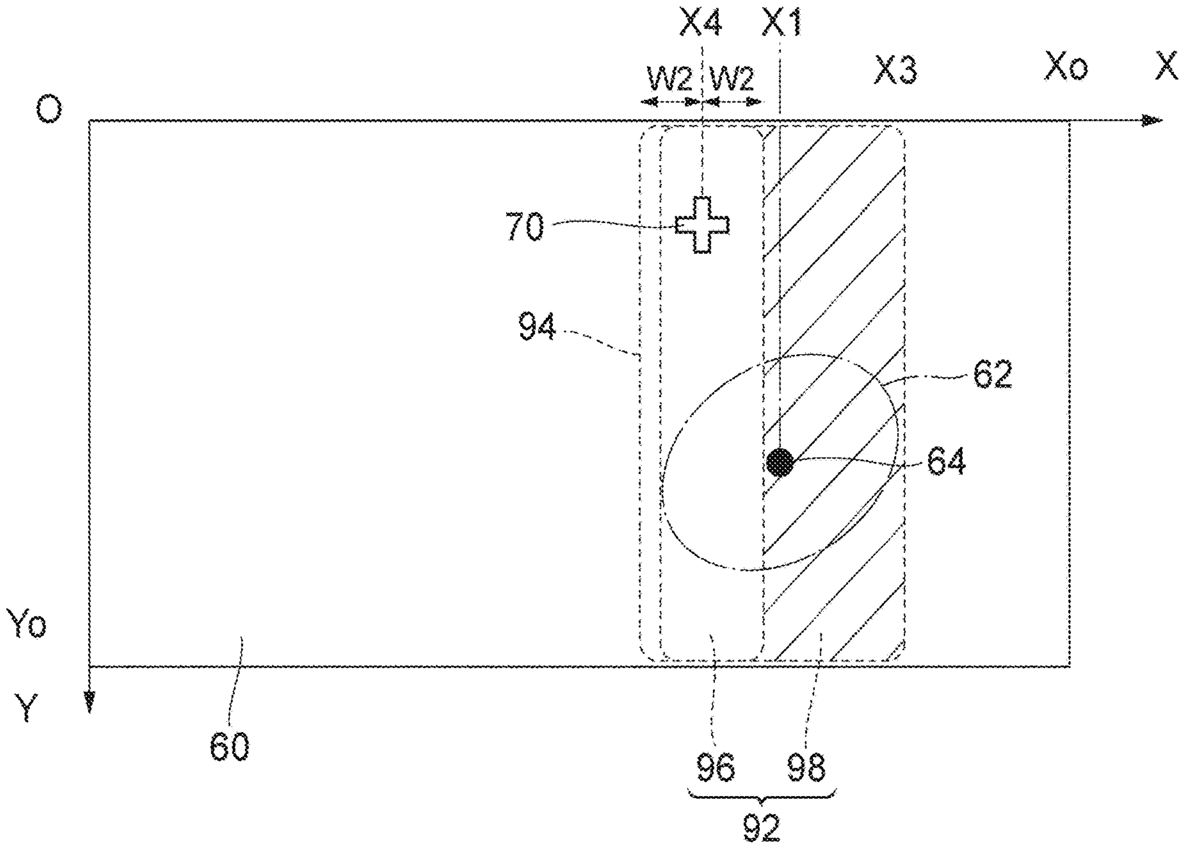
FIG. 21 depicts an example of a selection result of transmission electrodes based on the positions of the contact region and the electronic pen.

FIG. 21 depicts an example of a selection result of transmission electrodes based on the positions of the contact region 62 and the electronic pen 16. In the example, only the line electrodes 18X in part (that is, subregion 98) of the entire sensor region 60 are selected as transmission electrodes. The subregion 98 is determined from the relation between two subregions 92 and 94. The definition of the subregion 92 is the same as in the case of FIG. 20, and the description will not be repeated. The subregion 94 corresponds to a distance range within W2 based on the indication position 70 (X=X4) of the electronic pen 16. The two subregions 92 and 94 overlap at a subregion 96. In this case, the subregion 98 is a region obtained by subtracting the subregion 96 from the subregion 94. Therefore, the position or the size of the subregion 98 depends on the indication position 70 of the electronic pen 16 in the example of FIG. 21.

In step S24 of FIG. 18, the touch IC 22 attempts to communicate with the electronic pen 16 near the touch sensor 20. Specifically, the touch IC 22 transmits the uplink signals US generated by the touch IC 22 to the electronic pen 16 and receives the downlink signal DS from the electronic pen 16. Note that the uplink signals US are transmitted through the transmission electrodes selected in steps S22 and S23.

In step S25, the touch IC 22 checks whether or not the contact region 62 is nonexistent in the Y direction based on the execution result of the touch scan (see step S1 of FIG. 6). If the contact region 62 is nonexistent (step S25: YES), the touch IC 22 proceeds to step S26. On the other hand, if the contact region 62 exists (step S25: NO), the touch IC 22 proceeds to step S27.

In step S26, the touch IC 22 selects all of the line electrodes 18Y as transmission electrodes of the uplink signals US. This is because only the X direction is scanned in the primary scan (see step S2 of FIG. 6), and the position of the electronic pen 16 in the Y direction is not specified.

On the other hand, in step S27, the touch IC 22 selects transmission electrodes of the uplink signal US from all of the line electrodes 18Y based on the position of the contact region 62. For example, the touch IC 22 may use the same method as the method described in step S24 or use a different method to select the transmission electrodes.

In step S28, the touch IC 22 attempts to communicate with the electronic pen 16 near the touch sensor 20. Specifically, the touch IC 22 transmits the uplink signals US generated by the touch IC 22 to the electronic pen 16 and receives the downlink signal DS from the electronic pen 16. Note that the uplink signals US are transmitted through the transmission electrodes selected in steps S26 and S27.

In this way, the touch IC 22 alternately executes a first detection operation of detecting the contact region 62 or the contact position 64 of the human body BD on the touch sensor 20 and a second detection operation of detecting the indication position 70 of the electronic pen 16 including the pen electrode. In the second detection operation, the touch IC 22 selects L (1<L<N) line electrodes 18X as transmission electrodes from N sensor electrodes (N line electrodes 18X here) and performs transmission control of transmitting the uplink signals US from the L transmission electrodes. When the contact of the human body BD is not detected in the touch detection operation, the touch IC 22 selects L transmission electrodes according to the most recently detected indication position 70 of the electronic pen 16. On the other hand, when the contact of the human body BD is detected, the touch IC 22 selects L transmission electrodes according to the contact region 62 or the contact position 64.

This configuration also prevents the signal led to the pen electrode included in the electronic pen 16 from becoming temporarily undetectable due to the fluctuations of the GND potential caused by the signal led to the human body BD.

The touch IC 22 may also select L transmission electrodes according to the combination of either the contact region 62 or the contact position 64 and the indication position 70 when the contact of the human body BD is detected. Specifically, the touch IC 22 may select L transmission electrodes in the subregion 98, which is a region, which remains after excluding the subregion 96 including the indication position 70 from the subregion 92 including the contact position 64.

[Description of Electronic Pen 16]

<Configuration>

Figure 22:
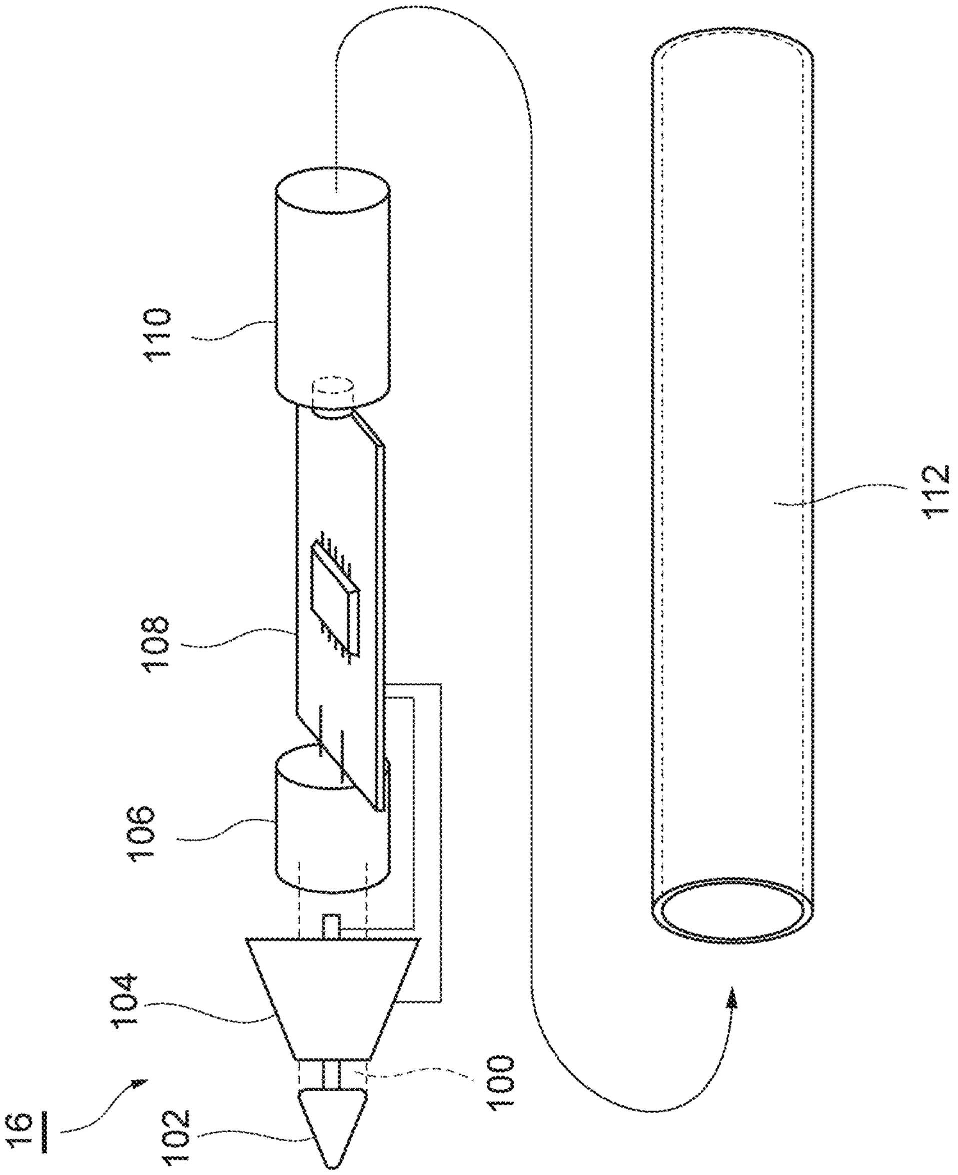
FIG. 22 schematically depicts an internal structure of the electronic pen of FIGS. 1 and 2.

FIG. 22 schematically depicts an internal structure of the electronic pen 16 of FIGS. 1 and 2. The electronic pen 16 includes a core 100, a tip electrode 102 (corresponding to a "first electrode"), a ring electrode 104 (corresponding to a "second electrode"), a pen pressure detection sensor 106, a circuit board 108, and a battery 110.

The core 100 is a rod-like member arranged along a penholder of the electronic pen 16. The tip electrode 102 and the ring electrode 104 are electrodes made of a conductive material, such as metal, or containing a conductive material. Specifically, the tip electrode 102 is a conical electrode attached to a tip of the core 100. The ring electrode 104 is an electrode in a tapered ring shape in which the diameter gradually decreases toward the tip.

As can be understood from FIG. 22, the tip electrode 102 and the ring electrode 104 are [1] provided at the pen tip (near the end of the housing 112), [2] having shapes different from each other, [3] arranged such that the directions of axes match with each other, [4] having rotational symmetry with respect to the penholder, and [5] separately arranged in the penholder direction. Note that the shapes and the arrangements of the tip electrode 102 and the ring electrode 104 are not limited to the example of FIG. 22, and the shapes and the arrangements may be appropriately changed as necessary.

The pen pressure detection sensor 106 is physically connected to the core 100 and is capable of detecting the pen pressure acting toward the tip of the core 100. An example of the pen pressure detection sensor 106 includes a variable capacitor in which the capacitance changes according to the pen pressure. The circuit board 108 is a board included in an electric circuit for activating the electronic pen 16. The battery 110 is a power source that supplies drive power to electronic parts or electronic elements provided on the circuit board 108.

The electronic pen 16 also includes a housing 112 that houses the constituent parts described above. The cylindrical housing 112 is made of a conductive material, such as metal, or contains a conductive material. When the user uses the electronic pen 16, the user holds the electronic pen 16 while touching the peripheral surface of the housing 112. In this way, the human body BD is electrically connected to the electronic pen 16 through capacitance formed in the contact area of the housing 112.

Figure 23:
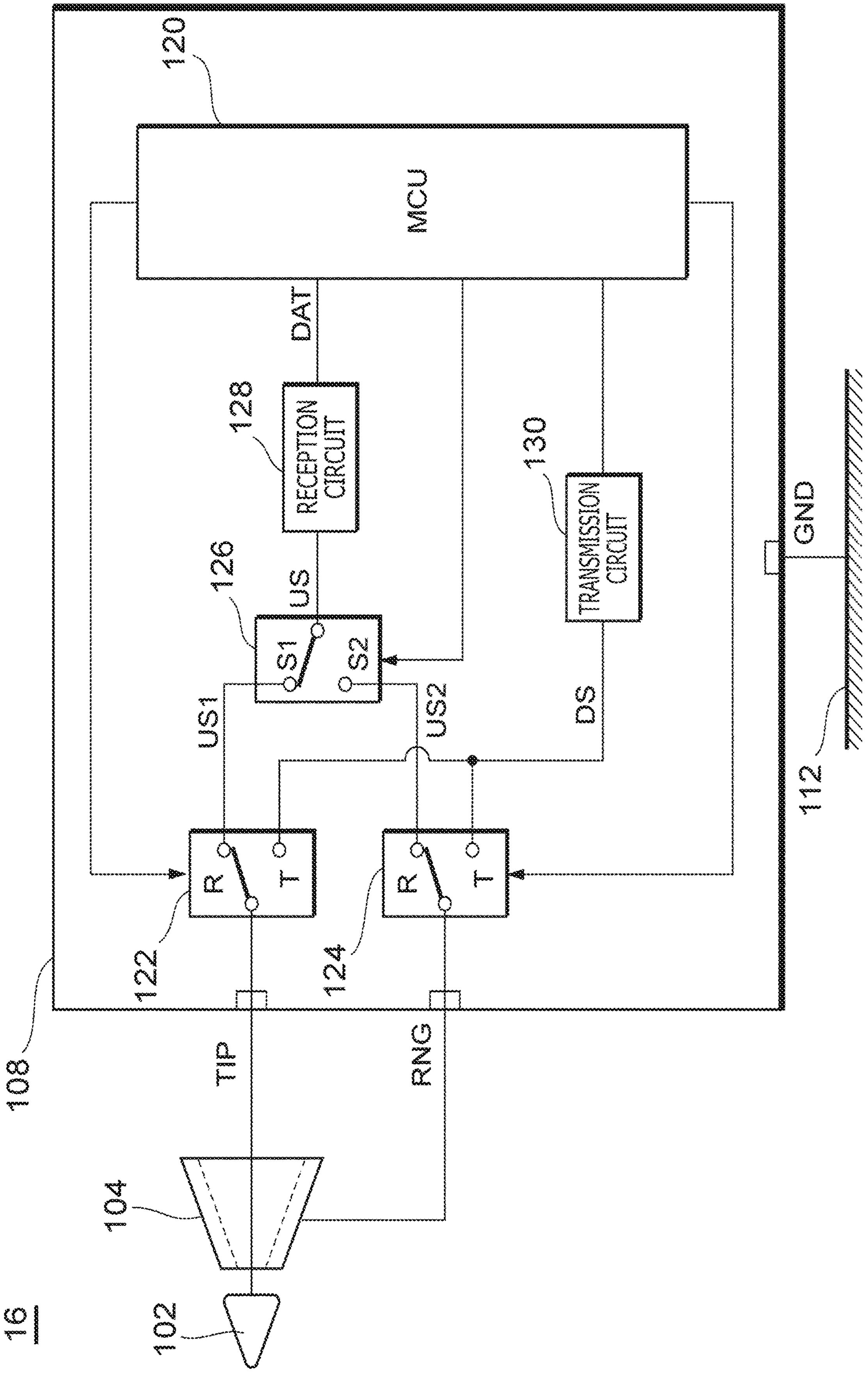
FIG. 23 is a block diagram of a circuit board illustrated in FIG. 22.

FIG. 23 is a block diagram of the circuit board 108 illustrated in FIG. 22. The circuit board 108 is provided with an MCU 120, a first switch 122, a second switch 124, a third switch 126, a reception circuit 128, and a transmission circuit 130.

The MCU 120 is a unit that comprehensively controls each component of the electronic pen 16. The MCU 120 can desirably control the reception in the reception circuit 128 to receive the uplink signal US from the electronic device 14. The MCU 120 can also desirably control the transmission in the transmission circuit 130 to transmit the downlink signal DS to the electronic device 14.

The first switch 122 is a switch element in which a common terminal and one of an R terminal and a T terminal are connected. The common terminal of the first switch 122 is connected to the tip electrode 102. The R terminal is connected to an S1 terminal of the third switch 126. The T terminal is connected to an output end of the transmission circuit 130. The MCU 120 performs switching control of the first switch 122 to selectively receive the uplink signal US1 and transmit the downlink signal DS.

The second switch 124 is a switch element in which a common terminal and one of an R terminal and a T terminal are connected. The common terminal of the second switch 124 is connected to the ring electrode 104. The R terminal is connected to an S2 terminal of the third switch 126. The T terminal is connected to the output end of the transmission circuit 130. The MCU 120 performs switching control of the second switch 124 to selectively receive the uplink signal US2 and transmit the downlink signal DS.

The third switch 126 is a switch element in which either the S1 terminal or the S2 terminal and a common terminal are connected. The common terminal of the third switch 126 is connected to an input end of the reception circuit 128. The MCU 120 performs switching control of the third switch 126 to selectively receive the uplink signals US1 and US2.

The reception circuit 128 is a circuit that demodulates the uplink signal US led to the tip electrode 102 or the ring electrode 104 and that outputs data DAT after the demodulation to the MCU 120. As described later, a ground end of the reception circuit 128 is grounded (or earth connection is provided) to the housing 112 of the electronic pen 16. Note that the MCU 120 applies predetermined signal processing to the data DAT after the demodulation to acquire control data from the electronic device 14.

The transmission circuit 130 is a circuit that generates the downlink signal DS according to the control of the MCU 120. The transmission circuit 130 outputs a carrier signal without modulation when the downlink signal DS is a "position signal." The transmission circuit 130 uses transmission data to modulate and output the carrier signal when the downlink signal DS is a "data signal."

Figure 24:
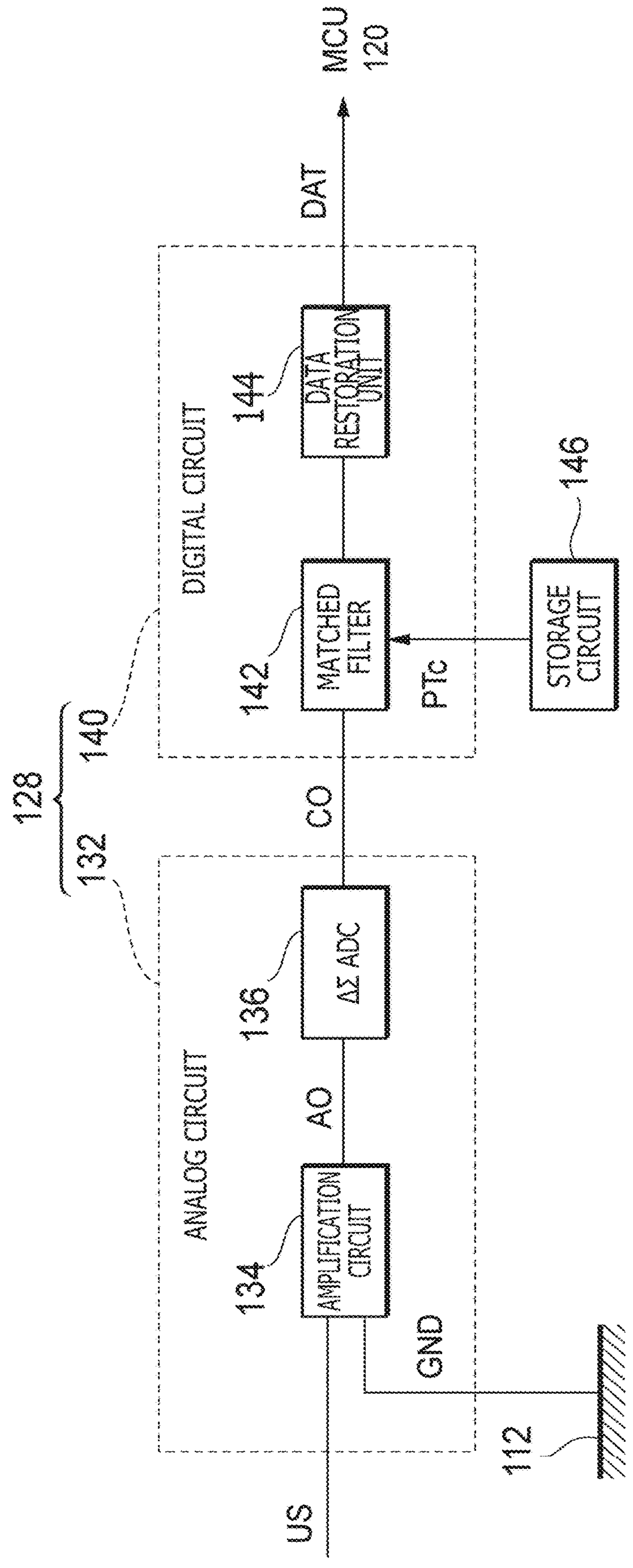
FIG. 24 depicts a specific configuration of a reception circuit of FIG. 23.

FIG. 24 depicts a specific configuration of the reception circuit 128 of FIG. 23. The reception circuit 128 includes an analog circuit 132 and a digital circuit 140 connected in series. The analog circuit 132 includes an amplification circuit 134 and a ΔΣ AD conversion circuit (hereinafter, ΔΣ ADC 136).

The amplification circuit 134 is a circuit that amplifies the uplink signal US led to the tip electrode 102 or the ring electrode 104. An input end of the amplification circuit 134 is connected to the common terminal of the third switch 126, and a ground end is connected to the housing 112. Note that although the amplification circuit 134 is directly connected to the housing 112 in the example of FIG. 24, the amplification circuit 134 may be indirectly connected to the housing 112 through a conductive member not illustrated.

The AZ ADC 136 is a circuit that applies delta-signal AD conversion to an output signal AO of the amplification circuit 134 to output a binary, ternary, or multi-level signal. Note that "delta-signal" denotes an AD conversion system for using an integrator to integrate (2) a difference (4) between a sampled voltage and an output voltage and comparing the magnitude between the obtained integral value and a reference voltage to thereby convert the signal into a pulse train.

The digital circuit 140 performs correlation calculation of an output signal CO obtained by processing the output signal AO of the amplification circuit 134 and a comparison pattern PTc corresponding to the uplink signal US to thereby detect the data DAT indication in the uplink signal US. Specifically, the digital circuit 140 includes a matched filter 142 and a data restoration unit 144.

The matched filter 142 performs correlation calculation between the output signal CO of the ΔΣ ADC 136 and the comparison pattern PTc read from a storage circuit 146 to detect the data signal corresponding to the uplink signa US. The "correlation calculation" here is calculation, in which correlation values of a sequentially supplied chip sequence and the known comparison pattern PTc (here, an array of spread codes corresponding to the uplink signal US) are calculated, and the bits are detected and output when the correlation value indicates a peak value.

The data restoration unit 144 has a function of restoring the data signal detected by the matched filter 142 according to a known rule and outputting the data DAT.

The storage circuit 146 stores comparison patterns PTc that are patterns (here, binary patterns of 0/1) indicating original waveforms, in relation to a plurality of spread codes that can be used by the touch IC 22 (FIGS. 2 and 4) to transmit the uplink signals US.

Figure 25:
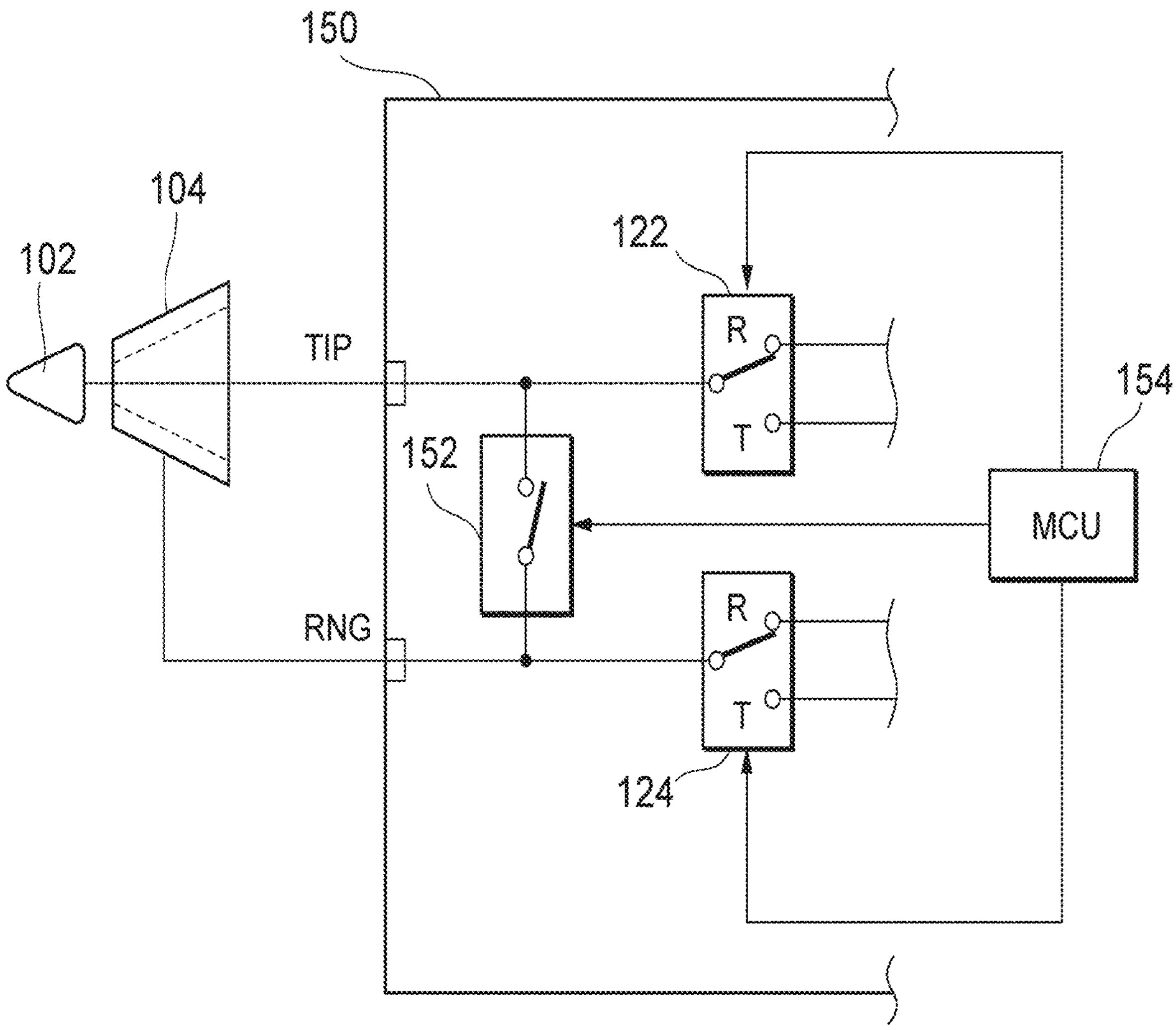
FIG. 25 is a partial block diagram of a circuit board in another example.

FIG. 25 is a partial block diagram of a circuit board 150 in another example. The circuit board 150 further includes a fourth switch 152 provided between the tip electrode 102 and the ring electrode 104, in addition to the components of the circuit board 108 illustrated in FIG. 23. The MCU 154 performs switching control of the fourth switch 152 to selectively perform electrical coupling or separation of the tip electrode 102 and the ring electrode 104. According to the configuration, the electronic pen 16 can receive the uplink signal US through one of [1] the tip electrode 102, [2] the ring electrode 104, and [3] a coupled electrode of the tip electrode 102 and the ring electrode 104.

<Operation>

Next, an operation of the circuit board 108 during communication with the electronic device 14 will be described. The circuit board 108 can select a reception mode of the uplink signal US. One of a normal mode and a switch mode among a plurality of types of reception modes is selected in the case illustrated here. The "switch mode" denotes a transmission control mode for receiving the uplink signal US while switching the pen electrode as necessary.

Figure 26:
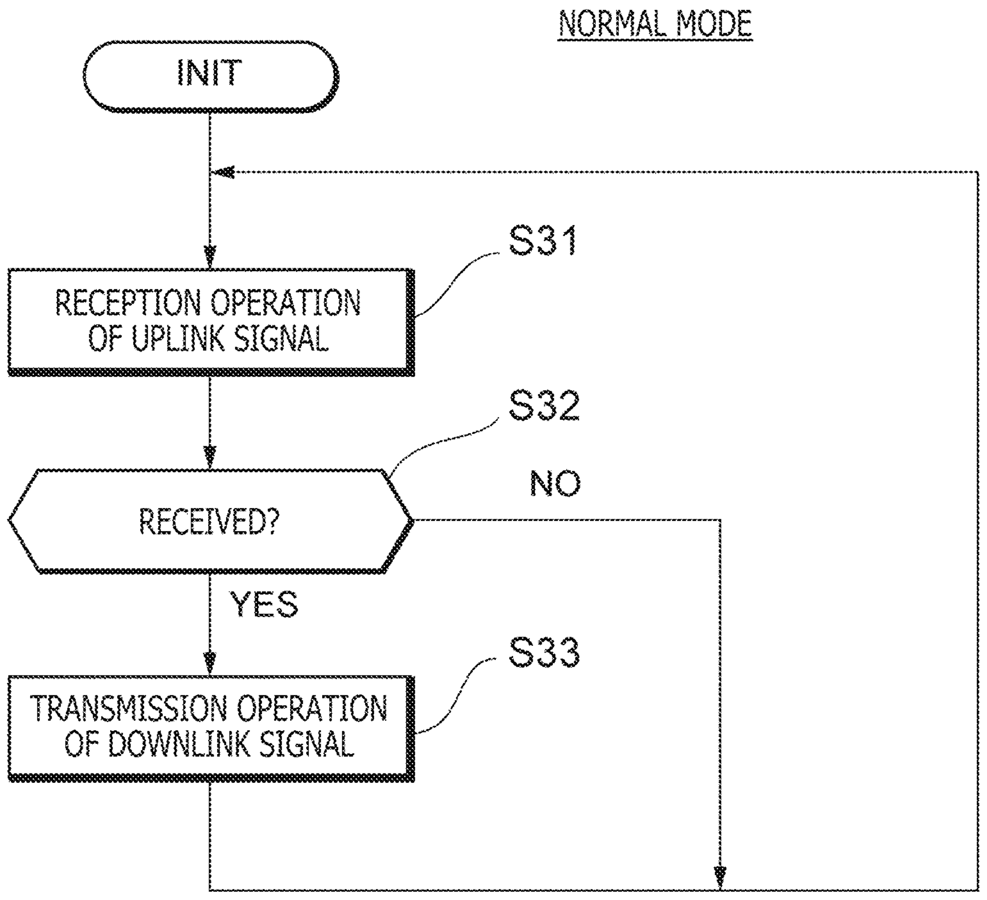
FIG. 26 is a flow chart illustrating a communication operation of the electronic pen in a normal mode.

FIG. 26 is a flow chart illustrating a communication operation of the electronic pen 16 in the normal mode. The "normal mode" denotes a transmission control mode for using a specific pen electrode to receive the uplink signal US. More specifically, the pen electrode to be used to receive the uplink signal US (hereinafter, referred to as a "reception electrode") is statically set to one (for example, the tip electrode 102) of [1] the tip electrode 102, [2] the ring electrode 104, and [3] the coupled electrode of the tip electrode 102 and the ring electrode 104 in the mode.

The circuit board 108 performs a reception operation of the uplink signal US (step S31). If the uplink signal US is correctly received or detected (step S32: YES), the circuit board 108 performs a transmission operation of the downlink signal DS (step S33) and then returns to step S31. On the other hand, if the uplink signal US is not correctly received (step S32: NO), the circuit board 108 skips the execution of step S33 and returns to step S31. The flow chart is repeatedly executed, and the electronic pen 16 transmits the downlink signal DS in synchronization with the transmission timing of the uplink signal US.

Figure 27:
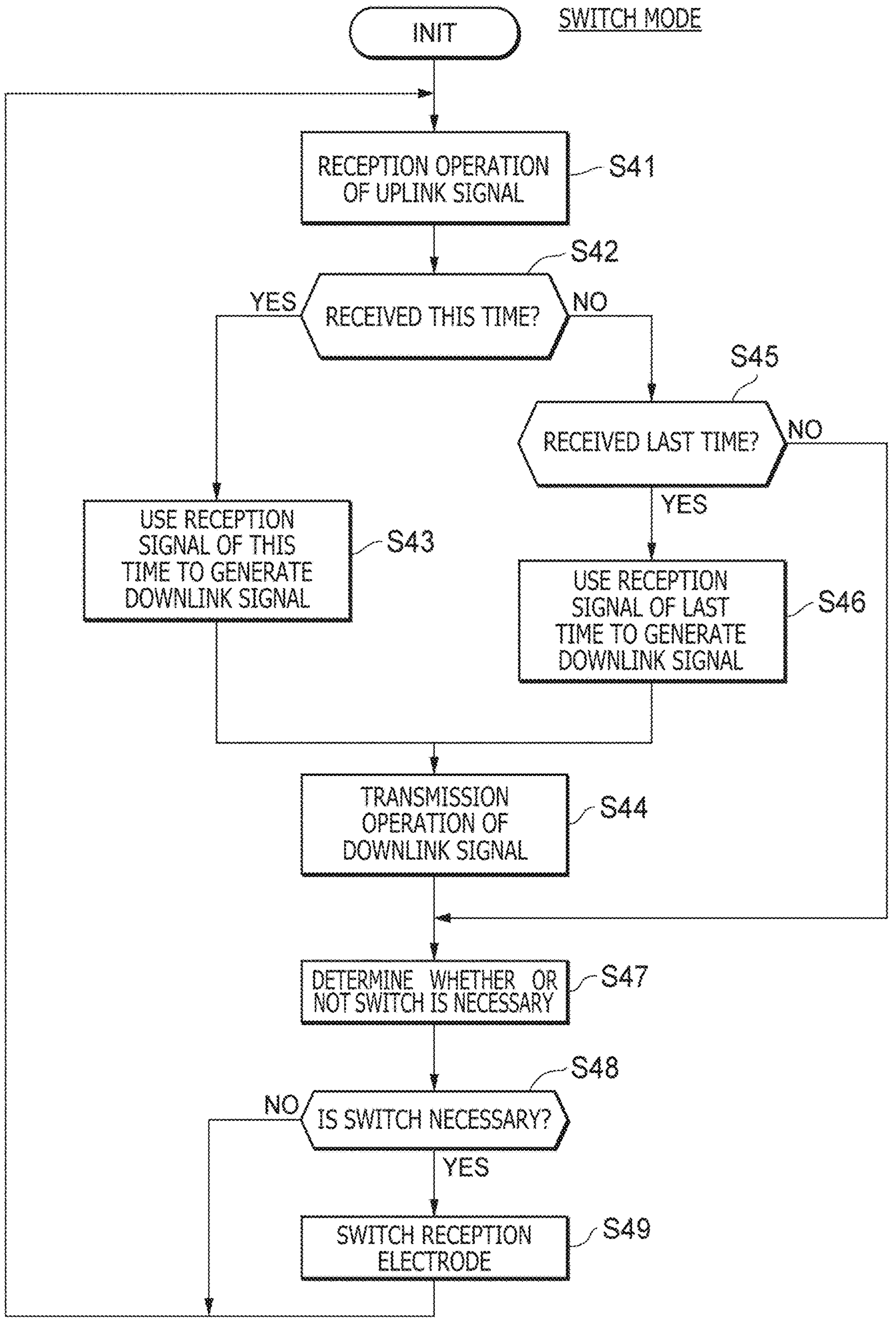
FIG. 27 is a flow chart illustrating a communication operation of the electronic pen in a switch mode.
Figure 28:
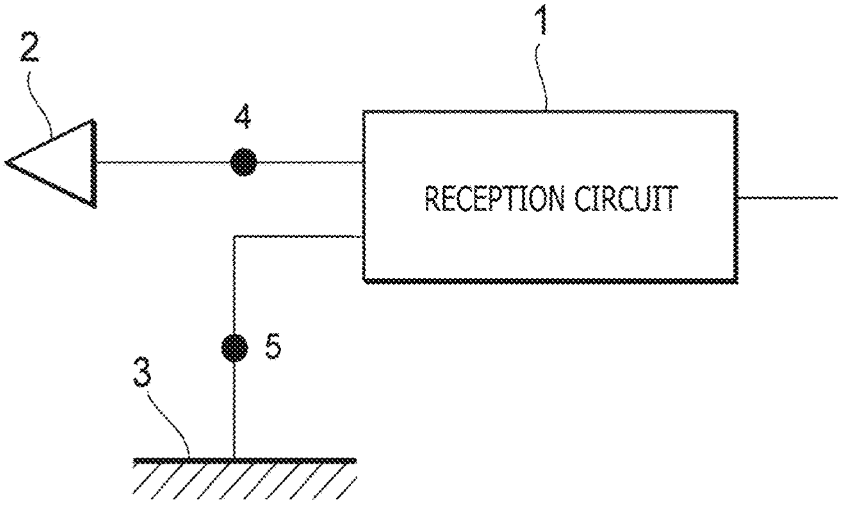
FIG. 28 schematically depicts a state in which the uplink signal is temporarily undetectable.
Figure 29:
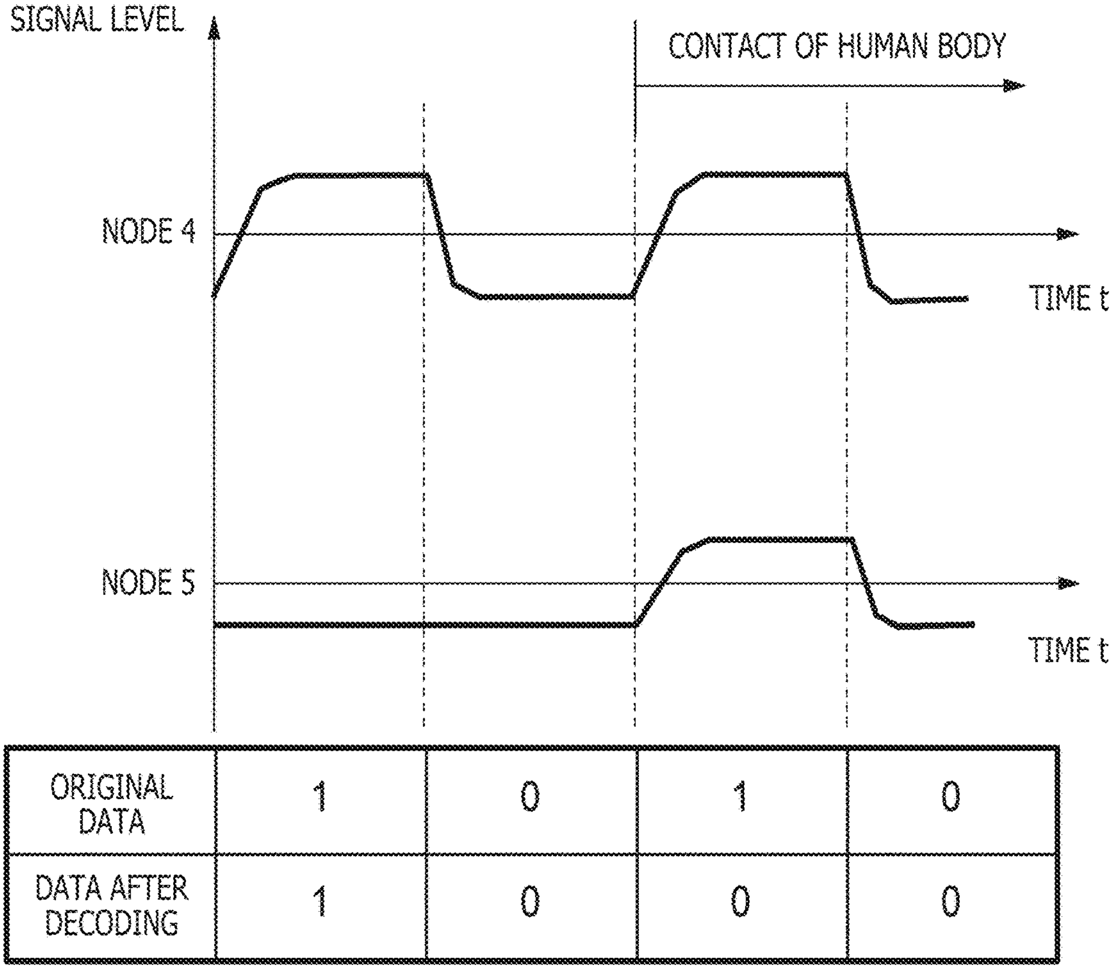
FIG. 29 schematically depicts the state in which the uplink signal is temporarily undetectable.

FIG. 27 is a flow chart illustrating a communication operation of the electronic pen 16 in the switch mode. The "switch mode" denotes a transmission control mode for receiving the uplink signal US while switching the pen electrode as necessary. More specifically, the reception electrode of the uplink signal US is dynamically set to one of [1] the tip electrode 102, [2] the ring electrode 104, and [3] the coupled electrode of the tip electrode 102 and the ring electrode 104 in the mode.

In step S41, the circuit board 108 uses the reception electrode selected at the moment to perform a reception operation of the uplink signal US.

In step S42, the circuit board 108 checks whether or not the present uplink signal US is correctly received or detected as a result of the present execution of step S41. If the present uplink signal US is received (step S42: YES), the circuit board 108 proceeds to the following step S43.

In step S43, the circuit board 108 uses the present uplink signal US received in step S42 to generate a downlink signal DS in response to the present reception.

In step S44, the circuit board 108 executes a transmission operation of the downlink signal DS generated in step S43. The touch IC 22 receives the downlink signal DS through the touch sensor 20. On the other hand, if the present uplink signal US is not received in step S42 (step S42: NO), the circuit board 108 proceeds to step S45.

In step S45, the circuit board 108 checks whether or not the previous uplink signal US (of the last time) is correctly received or detected as a result of the previous execution of step S41. If the previous uplink signal US is not received (step S45: NO), the circuit board 108 skips the execution of steps S46 and S44 and proceeds to step S47 described later. On the other hand, if the previous uplink signal US is received (step S45: YES), the circuit board 108 proceeds to the following step S46.

In step S46, the circuit board 108 uses the previous uplink signal US (of the last time) received in step S42 to generate a downlink signal DS in response to the present reception. The circuit board 108 performs a transmission operation of the downlink signal DS generated in step S46 (step S44).

In step S47, the circuit board 108 determines whether or not the transmission electrode needs to be switched. For example, the circuit board 108 may determine that the switch of the transmission electrode is "unnecessary" when the present uplink signal US is detected and may determine that the switch of the transmission electrode is "necessary" when the present uplink signal US is not detected.

In step S48, if the switch of the transmission electrode is not necessary (step S48: NO), the circuit board 108 skips the execution of step S49 and returns to step S41. On the other hand, if the switch of the transmission electrode is necessary (step S48: YES), the circuit board 108 proceeds to the following step S49.

In step S49, the circuit board 108 switches the reception electrode among M pen electrodes according to a predetermined order of switch. In the example of FIG. 23, when the current reception electrode is the tip electrode 102, the tip electrode 102 is switched to the ring electrode 104. Further, in the example of FIG. 25, when the current reception electrode is the tip electrode 102, the tip electrode 102 is switched to one of the ring electrode 104 and the coupled electrode (combination of the tip electrode 102 and the ring electrode 104).

The electronic pen 16 can repeatedly execute the flow chart to transmit the downlink signal DS in synchronization with the transmission timing of the uplink signal US.

CONCLUSION

In this way, the electronic pen 16 is used along with the touch IC 22 connected to the electrostatic-capacitance touch sensor 20 including N sensor electrodes. The electronic pen 16 includes M (M≥2) pen electrodes and performs control of determining the reception electrodes that are one or more pen electrodes among M pen electrodes and changing the set of transmission electrodes and reception electrodes of the uplink signals US according to time. This configuration can also prevent the signal led to the pen electrode included in the electronic pen 16 from becoming temporarily undetectable due to the fluctuations of the GND potential caused by the signal led to the human body BD.

The M pen electrodes here may include the tip electrode 102 provided at the pen tip of the electronic pen 16, the ring electrode 104 positioned on the back side of the pen tip, and the electrode in which the tip electrode 102 and the ring electrode 104 are electrically connected.

Further, when the electronic pen 16 receives and detects the uplink signal US periodically transmitted from the touch IC 22, the electronic pen 16 may determine the reception electrode for the next detection process among the M pen electrodes included in the electronic pen 16 according to at least the detection result of the uplink signal US in the present detection process. Furthermore, when the uplink signal US is not detected through reception from one reception electrode in the present detection process, the electronic pen 16 may switch the reception electrode for the next detection process to one of the other pen electrodes. In addition, when the uplink signal US is not detected in the present detection process, the electronic pen 16 may also transmit the downlink signal DS generated based on the most recently detected uplink signal US.

Another Operation Example

Next, another operation example of the electronic pen 16 will be described.

Although the circuit board 108 switches the reception electrode when the circuit board 108 cannot detect the present and previous uplink signals US in step S49 of FIG. 27, the determination condition is not limited to such configuration. For example, when the uplink signal US is continuously not detected by (at) one reception electrode for a predetermined number of detections, the electronic pen 16 may switch the reception electrode for the next detection process to one of the other pen electrodes.

Although the reception electrode is switched according to the predetermined order of switch in step S49 of FIG. 27, the rule of switching is not limited to such configuration. For example, the electronic pen 16 may measure the reception level of the uplink signal US while switching the reception electrode and may determine the reception electrode according to the obtained reception level. Specifically, the electronic pen 16 can determine, as the reception electrode, one pen electrode in which the most recently received signal strength is the maximum.

Although the circuit board 108 switches the reception electrode according to the detection result of the uplink signal US in step S49 of FIG. 27, the trigger of the switch is not limited to such configuration. For example, when the touch IC 22 can transmit a control signal for switching the transmission electrode of the electronic pen 16 to the electronic pen 16, the electronic pen 16 may switch the reception electrode in response to the reception of the control signal. In this way, the electronic pen 16 can switch the reception electrode at more suitable timing in cooperation with the touch IC 22 as a communication partner.

What is claimed is:

1. A sensor control circuit connected to a capacitance touch sensor including sensor electrodes, wherein the sensor control circuit alternately executes a first detection operation of detecting a contact region or a contact position of a human body with the touch sensor and a second detection operation of detecting an indication position of an electronic pen including a pen electrode, and in the second detection operation, the sensor control circuit:

performs transmission control of selecting transmission electrodes, from the sensor electrodes, and transmitting uplink signals from the transmission electrodes, when a contact with the human body is not detected in the first detection operation, selects the transmission electrodes according to a most recently detected indication position of the electronic pen detected in the second detection operation, and when a contact with the human body is detected in the first detection operation, selects the transmission electrodes according to the contact region or the contact position of the human body detected in the first detection operation.

2. The sensor control circuit according to claim 1, wherein the sensor control circuit is configured to perform control of changing a set of the transmission electrodes used to transmit the uplink signals according to time in a time-division manner.

3. The sensor control circuit according to claim 1, wherein the sensor control circuit, when a contact with the human body is detected, selects the transmission electrodes according to a combination of the contact region or the contact position of the human body and the most recently detected indication position of the electronic pen.

4. The sensor control circuit according to claim 3, wherein the sensor control circuit, when a contact with the human body is detected, selects the transmission electrodes in a region, which remains after excluding a second subregion including the most recently detected indication position of the electronic pen from a first subregion including the contact region or the contact position of the human body.

* * * * *